(12) United States Patent
Tsukada et al.

(10) Patent No.: US 7,392,252 B2
(45) Date of Patent: Jun. 24, 2008

(54) SYSTEM, APPARATUS, AND METHOD FOR PROCESSING INFORMATION, AND COMPUTER PROGRAM, AND RECORDING MEDIUM

(75) Inventors: Hiroshi Tsukada, Sapporo (JP); Akihiro Kaneko, Sapporo (JP); Akinori Shimamura, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 445 days.

(21) Appl. No.: 11/066,463

(22) Filed: Feb. 28, 2005

(65) Prior Publication Data

US 2006/0101087 A1    May 11, 2006

(30) Foreign Application Priority Data

Nov. 5, 2004    (JP) ............................. 2004-322426

(51) Int. Cl.
G06F 17/30    (2006.01)
(52) U.S. Cl. .............................. 707/8; 707/10; 707/200; 709/203
(58) Field of Classification Search ................. 707/100, 707/2–5, 8, 10, 200, 201; 709/203
See application file for complete search history.

(56) References Cited

U.S. PATENT DOCUMENTS

2003/0123443 A1* 7/2003 Anwar ......................... 370/392
2005/0262239 A1* 11/2005 Kawakita ..................... 709/224

FOREIGN PATENT DOCUMENTS

| JP | 11-150532 | 6/1999 |
|---|---|---|
| JP | 2000-148611 | 5/2000 |
| JP | 2000-207305 | 7/2000 |
| JP | 2000-285074 | 10/2000 |
| JP | 2000-311204 | 11/2000 |
| JP | 2002-33787 | 1/2002 |
| JP | 2002-49567 | 2/2002 |
| JP | 2002-73650 | 3/2002 |
| JP | 2002-157548 | 5/2002 |
| JP | 2002-373110 | 12/2002 |
| JP | 2002-373225 | 12/2002 |
| JP | 2003-16019 | 1/2003 |
| JP | 2003-150438 | 5/2003 |
| JP | 2003-216666 | 7/2003 |
| JP | 2003-296258 | 10/2003 |

* cited by examiner

Primary Examiner—Cheryl Lewis
(74) Attorney, Agent, or Firm—Staas & Halsey LLP

(57) ABSTRACT

An information processing apparatus, present in an intranet, sharing information with an information processing apparatus present in the other intranet connected to the intranet via a network, includes a memory storing the information, and a controller setting the information stored in the memory to an update disabled state in the updating of the information stored in the memory if the information is in an update enabled state, requesting the information processing apparatus sharing the information and present in the other intranet to set an update disabled state, and updating the information on condition that the update disabled state is set in all information processing apparatuses sharing the information and present in the intranets. Updating of the information shared by a plurality of intranets connected to each other via a network is thus synchronized to prevent updating contention.

9 Claims, 20 Drawing Sheets

SYSTEM, APPARATUS, AND METHOD FOR PROCESSING INFORMATION, AND COMPUTER PROGRAM, AND RECORDING MEDIUM

BACKGROUND OF THE INVENTION

1. Field of the Invention

The present invention relates to information processing in a plurality of intranets connected to each other via a network and, in particular, to a system, an apparatus, a method, a computer program, and a recording medium for synchronizing the updating of shared information including a document in the information processing.

2. Description of the Related Art

Information is typically shared among intranets connected to each other via a network, such as the Internet. The shared information is, in general, maintained and managed to the same state (synchronized) by transferring files in the file transfer protocol (FTP). When a file is transferred via a network, the file must pass through a variety of security steps arranged in each intranet. If the networks are different in security policy, sharing information becomes technically and procedurally difficult.

Concerning such sharing information among intranets, when information is shared within the Internet or among a plurality of intranets, a single information management server collects and generally manages information. The information is then opened on that server or a public server for disclosing information to users in a different system. Such a technique is disclosed in Japanese Unexamined Patent Application Publication Nos. 2000-311204 and 2002-373225.

Updated information is transferred in accordance with updating of each database among intranets (Japanese Unexamined Patent Application Publication No. 2000-148611). Updating of information is performed via electronic mails (Japanese Unexamined Patent Application Publication Nos. 2000-285074, 2003-150438, 11-150532, 2000-207305, and 2003-16019). By mutually exchanging information via electronic mails, information is shared and a transmitted schedule is then displayed on a schedule display (Japanese Unexamined Patent Application Publication No. 2002-49567).

When information is managed separately by a plurality of intranets, the shared information can lose consistency. For example, the shared information can be individually updated by each intranet, or updated information cannot be reflected in another intranet. Such an in convenience becomes pronounced when information is shared among intranets of networks different in security policy. When information shared by intranets is updated in response to an update request, an acknowledgement of updating of information is difficult without notification. Information shared by a plurality of intranets that limit access from the outside must be maintained to the same state. Intranet to intranet communications are required in such a case, but it is difficult to clear security restrictions (firewall proxy). In particular, if restrictions different in security policy are applied, it takes time to share information passing through the security restrictions.

Information shared by intranets can be accessed by another intranet to learn the update status of the information, but security restrictions makes it difficult for the other intranet to examine the update status.

The more the number of intranets sharing information, the longer time is required for each intranet to make an access request and to receive an access result. Communications take more time, and replies are delayed. Management of transmission and reception and internal process become complex.

There are no mentions about a solution to these problems in Japanese Unexamined Patent Application Publication Nos. 2000-311204, 2002-373225, 2000-148611, 2000-285074, 2003-150438, 11-150532, 2000-207305, 2003-16019, and 2002-49567.

SUMMARY OF THE INVENTION

Accordingly, it is an object of the present invention to synchronize the updating of information shared by a plurality of intranets connected to each other via a network to prevent updating contention.

It is also another object of the present invention to prevent concurrent updating of information shared by a plurality of intranets connected to each other via a network.

According to a first aspect of the present invention, an information processing apparatus, present in an intranet, sharing information with an information processing apparatus present in the other intranet connected to the intranet via a network, includes a memory storing the information, and a controller setting the information stored in the memory to an update disabled state in the updating of the information stored in the memory if the information is in an update enabled state, requesting the information processing apparatus sharing the information and present in the other intranet to set an update disabled state, and updating the information on condition that the update disabled state is set in all information processing apparatuses sharing the information and present in the intranets.

When the information shared with the other intranet connected to the intranet via the network is updated, the information, if in the update enabled state, is set to be in the update disabled state. In the update disabled state, a request to update from the other intranet is rejected, and the information processing apparatus proceeds to an update process. In other words, the update disabled state declares that the update process is in progress. Taking this opportunity, the information processing apparatus requests the information processing apparatus in the other intranet to set the update disabled state. The shared information is thus updated on condition that the update disabled state is set in all information processing apparatuses present in the other intranet connected to the intranet via a network. When update contention occurs, the controller sets priority among the intranets, thereby preventing concurrent updating of information. This arrangement is not intended to block the updating of information. The information is updated in sequential order. In response to an update request, information updating is performed earlier in an intranet with an update disabled state set earlier therewithin. As a result, information updating contention is prevented, and no discrepancy is caused in the shared information among the intranets. Reliable information updating is thus performed.

The memory may store information representing one of the update disabled state and the releasing of the update disabled state set in the information.

The controller may set the information to the update disabled state in the updating of the information stored in the memory if the information stored in the memory is in the update enabled state, and may release the update disabled state if the information processing apparatus present in the other intranet is in the update disabled state. With this arrangement, the information processing apparatus can accept a request to set the update disabled state from the other intranet. The information can be updated by the other intranet.

Requests to set the update disabled state and to update the information, issued from the controller, may be transmitted via an electronic mail. With this arrangement, the information updating is performed by the electronic mail if the same information is shared by intranets to which external access is restricted.

For a particular intranet to set the information to the update disabled state, the controller may inhibit any intranet other than the particular intranet from releasing the update disabled state and updating the information.

According to a second aspect of the present invention, an information processing apparatus, present in an intranet, sharing information with an information processing apparatus present in the other intranet connected to the intranet via a network, includes a memory storing the information, an information updating unit receiving a request to update the information, an information management unit determining, in response to the update request, whether the information is in an update enabled state, and setting an update disabled state if it is determined that the information is in the update enabled state, and updating the information in synchronization with the information processing apparatus present in the other intranet, and an information synchronizing unit determining whether the information in the information processing apparatus present in the other intranet is in an update enabled state, requesting the information processing apparatus in the other intranet to set the update disabled state therewithin if it is determined the information processing apparatus in the other intranet is in the update enabled state, and requesting the information processing apparatus present in the other intranet to update the information on condition that the information processing apparatus in the intranet and the information processing apparatus present in the other intranet are set in the update disabled state.

According to a third aspect of the present invention, a method of an information processing apparatus, present in an intranet, sharing information with an information processing apparatus present in the other intranet connected to the intranet via a network, includes updating the information stored in a memory, setting an update disabled state in the updating of the information if the information is in an update enabled state, requesting the information processing apparatus present in the other intranet and sharing the information to set an update disabled state, and updating the information on condition that the update disabled state is set in all information processing apparatuses sharing the information and present in the intranets.

Since the information, if in the update enabled state, is set to the update disabled state before updating the information stored in the memory, the request to update the information from the other intranet can be rejected. The intranet with the update disabled state set requests the information processing apparatus in the update enabled state in the other intranet to set the update disabled state. If the update disabled state is already set in the information processing apparatus in the other intranet, the request to set the update disabled state is rejected. If the update disabled state is set in all information processing apparatuses present in own intranet and the other intranet, the request to update the information is accepted, and the information is then updated. In response to an information update request, update requests are prioritized so that different update requests contending for information updating are well controlled. As a result, the information shared among the intranets is maintained to the same state.

According to a fourth aspect of the present invention, a computer program causes a computer to perform a method of an information processing apparatus, present in an intranet, sharing information with an information processing apparatus present in the other intranet connected to the intranet via a network. The computer program includes steps of updating the information stored in a memory, setting an update disabled state in the updating of the information if the information is in an update enabled state, requesting the information processing apparatus present in the other intranet and sharing the information to set an update disabled state, and updating the information on condition that the update disabled state is set in all information processing apparatuses sharing the information and present in the intranets.

According to a fifth aspect of the present invention, a recording medium stores a computer program for causing a computer to perform a method of an information processing apparatus, present in an intranet, sharing information with an information processing apparatus present in the other intranet connected to the intranet via a network. The computer program includes updating the information stored in a memory, setting an update disabled state in the updating of the information if the information is in an update enabled state, requesting the information processing apparatus present in the other intranet and sharing the information to set an update disabled state, and updating the information on condition that the update disabled state is set in all information processing apparatuses sharing the information and present in the intranets.

According to a sixth aspect of the present invention, an information processing system of an intranet shares information with the other intranet connected to the intranet via a network. Each intranet includes a memory storing the information, and a controller setting the information stored in the memory to an update disabled state in the updating of the information stored in the memory if the information is in an update enabled state, requesting the other intranet sharing the information to set an update disabled state, and updating the information on condition that the update disabled state is set in all intranets sharing the information.

The information processing apparatus updates the information shared by the intranets without contending for concurrent information updating, thereby precluding discrepancy in the shared information. Problems due to a discrepancy in the shared information is thus overcome.

The present invention has the following advantages.

Update contention of the information shared by the intranets is prevented. Information discrepancy due to the update contention is thus avoided, and the reliability of the information shared by the intranets is heightened.

When the information stored in the memory is updated in the intranet, the controller sets the update disabled state if the information is in the update enabled state thereof, and releases the update disabled state if update disabled state is set in the other intranet. The other intranet's request to set the update disabled state is thus accepted. The intranets contending for the information updating is properly controlled.

Since the electronic mail is used for the controller to issue requests to set the update disabled state and to update the information, the updating of the information is easily performed using the electronic mail if the same information is shared by the intranets to which external access is restrained.

These and other objects, features, and advantages of the present invention will become apparent when the following detailed description is considered with the accompanying drawings.

DESCRIPTION OF THE PREFERRED EMBODIMENTS

Figure 1:
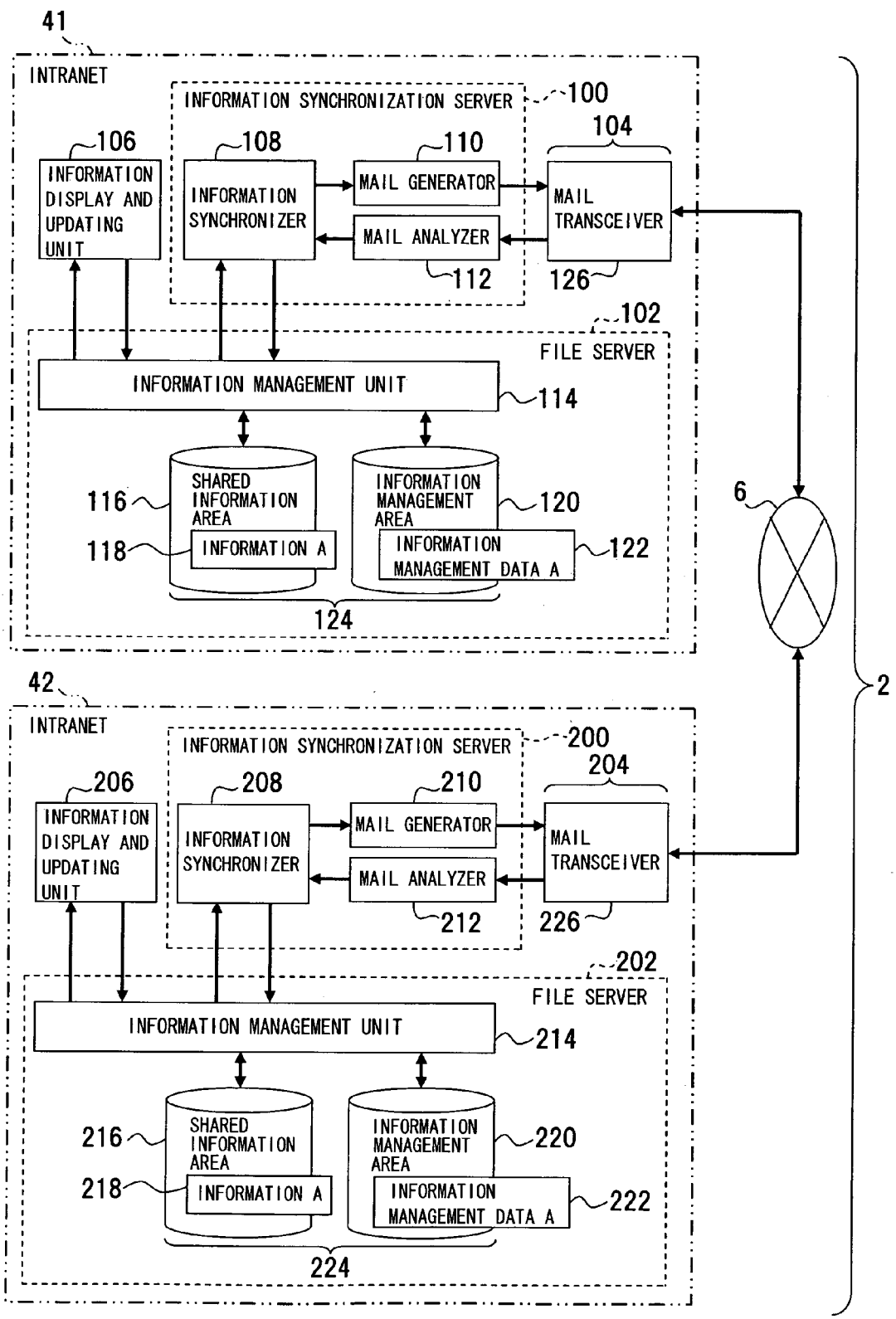
FIG. 1 is a block diagram of an information processing system of an intranet.

An information processing system 2 of an intranet of one embodiment of the present invention is described below with reference to FIG. 1. FIG. 1 is a block diagram illustrating the information processing system 2 of the intranet.

The information processing system 2 is a shared information synchronization system including a plurality of intranets connected to each other via a network such as the Internet. The intranets share information, such as documents, in a manner such that controls information update contention. For simplicity of explanation, the information processing system 2 includes only two intranets 41 and 42, as the plurality of intranets, connected to each other via the Internet 6.

Each of the intranets 41 and 42 is a network including a plurality of computers, as information processing apparatuses. Each information processing apparatus includes a recording medium storing an information processing program of the present invention. The intranet 41 includes an information synchronization server 100, a file server 102, a mail transceiver server 104, etc. The intranet 42 includes an information synchronization server 200, a file server 202, a mail transceiver server 204, etc. Each of the information display and updating units 106 and 206 in the respective intranets 41 and 42 is a document editing software program in Client machines such as personal computers in the intranets. The information display and updating unit 106 displays and/or updates the information, and receives a request to update the information shared by the intranet 42. Similarly, the information display and updating unit 206 displays and/or updates the information and receives a request to update the information shared by the intranet 41.

An information synchronizer 108 is one of programs in the information synchronization server 100. In response to a request to update the information, the information synchronizer 108 requests the intranet 42 to set the update disabled state and performs a determination process to the intranet 42 to determine whether information updating is enabled. Similarly, an information synchronizer 208 is one of programs in the information synchronization server 200. In response to a request to update the information, the information synchronizer 208 requests the intranet 41 to set the update disabled state and performs a determination process to the intranet 41 to determine whether information updating is enabled. The setting of the update disabled state is intended to reject an update request from the other intranet, and to shift the information toward an update process. The update disabled state declares that the updating of the information is currently in progress.

A mail generator 110 is one of the programs in the information synchronization server 100. The mail generator 110 generates electronic mails to the intranet 42 for issuing a variety of requests, including a request to set the update disabled state in the information, a request to update the information, and a notification to notify of other information. Similarly, a mail generator 210 is one of the programs in the information synchronization server 200. The mail generator 210 generates electronic mails to the intranet 41 for issuing a variety of requests, including a request to set the update disabled state in the information, a request to update the information, and a notification to notify of other information.

A mail analyzer 112 is one of the programs in the information synchronization server 100. The mail analyzer 112 analyzes an electronic mail transmitted from the intranet 42 and transfers the analysis results to an information synchronizer 108. Similarly, a mail analyzer 212 is one of the programs in the information synchronization server 200. The mail analyzer 212 analyzes an electronic mail transmitted from the intranet 41, and transfers the analysis results to an information synchronizer 208.

A information management unit 114 in the file server 102 manages a variety of information while serving as an input and output unit of the variety of information. In response to an information update request from the information display and updating unit 106, the information management unit 114 sets the update disabled state, releases the update disabled state, and requests the intranet 42 to set the update disabled state and release the update disabled state. Similarly, an information management unit 214 in the file server 202 manages a variety of information while serving as an input and output unit of the variety of information. In response to an information update request from the information display and updating unit 206, the information management unit 214 sets the update disabled state, releases the update disabled state, and requests the intranet 41 to set the update disabled state and release the update disabled state.

A shared information area 116, arranged in the file server 102, serves as a first storage unit storing information 118 shared by the intranets 41 and 42. In this case, the information 118 is information "A". An information management area 120, arranged in the file server 102, serves as a second storage unit storing information management data 122 used to manage the information 118. The information management data 122 is information management data "A" corresponding to the information "A". A database 124 is composed of the shared information area 116 and the information management area 120, respectively storing the information 118 shared by the intranets 41 and 42, and the information management data 122. The database 124 can be arranged external to the file server 102. To work with the database 124, a controller for executing an update process of the shared information is composed of the information synchronization server 100 and the information management unit 114 in the file server 102.

The intranet 42 is similar in structure to the intranet 41. A shared information area 216, arranged in the file server 202, serves as a first storage unit storing the information 218 shared by the intranets 41 and 42. The information 218 is information "A". An information management area 220, arranged in the file server 202, serves as a second storage unit storing information management data 222 used to manage the information 218. The information management data 222 is information management data "A" corresponding to the information "A". A database 224 is composed of the shared information area 216 and the information management area 220, respectively storing the information 218 shared by the intranets 41 and 42, and the information management data 222. The database 224 can be arranged external to the file server 202. As in the intranet 41, to work with the database 224, a controller executing an update process of the shared information is composed of the information synchronization server 200 and the information management unit 214 in the file server 202.

A mail transceiver 126 transmits and receives electronic mails to and from the intranet 42, and a mail transceiver 226 transmits and receives electronic mails to and from the intranet 41.

In this arrangement, the information shared by the intranets 41 and 42 is individually stored in the shared information areas 116 and 216. The shared information can be updated by the request from the intranets 41 and 42. If arbitrary updating is permitted, the content in the shared information area 116 becomes different from the content in the shared information area 216. To avoid such an information discrepancy, a rule is applied to update processing. More specifically, when the information 118 is updated, the update disabled state is set in the intranet 41 if the information 118 is in the update enabled state. The controller requests the intranet 42 having the information 218 common to the information 118 to set the update disabled state. The information 118 and the information 218 can be updated on condition that all the intranets 41 and 42 are set to the update disabled state in connection with the shared information 118 and information 218. If the update disabled state is already set in the intranet 42, the request of the intranet 41 to set the update disabled state is rejected. The request of the intranet 42 to update the shared information is accepted. The request of the intranet 41 to update the shared information is honored subsequent to the update process requested by the intranet 42.

In this update process, information update contention is prevented. No discrepancy takes place in the information shared between the intranets. Reliable information updating is performed while the reliability of the information shared by the intranets is maintained.

Figure 2:
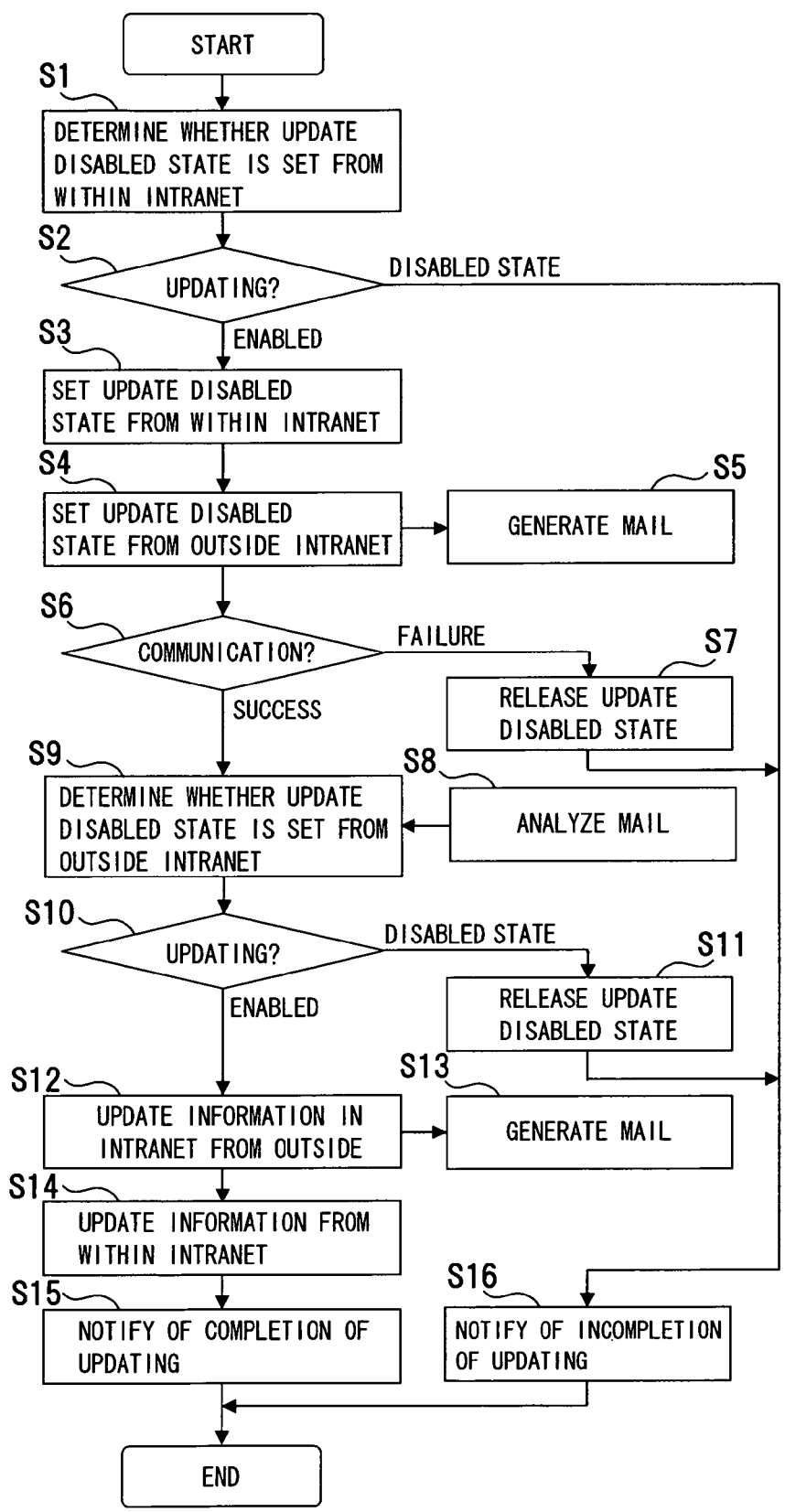
FIG. 2 is a flowchart illustrating an information processing procedure performed between intranets.

The information update process is described in detail with reference to FIG. 2. FIG. 2 illustrates an information processing method performed between intranets and a procedure of an information processing program.

If the information display and updating unit 106 references the information management unit 114 concerning the information 118 in the intranet 41, the information management unit 114 reads the information 118 in the shared information area 116. The information display and updating unit 106 issues an update request to the information management unit 114 concerning the information 118.

The intranet 41 determines whether the update disabled state is set in the information management unit 114 (step S1) In that determination process, the information management data 122 corresponding to the information 118 in the shared information area 116 is read from the information management area 120. The controller determines in step S2 whether the update disabled state of the information 118 is set in the information management data 122 (F=1 or F=0). If it is determined that the update disabled state is not set (F=0), in other words, that the information 118 is in an update enabled state, the controller sets the update disabled state in the information management data 122 concerning the information 118 (step S3). The controller then requests the intranet 42 to set the update disabled state (step S4). The information synchronizer 108 notifies the mail generator 110 of that request, and the mail generator 110 generates an electronic mail requesting the intranet 42 to set the update disabled state (step S5). The electronic mail requesting the setting of the update disabled state is transmitted to the intranet 42 via the Internet 6. A reply to the electronic mail is then received (step S6). If the delivery of the electronic mail is incomplete, the update disabled state is released, and the releasing of the update disabled state is set (step S7).

Upon receiving an electronic mail from the intranet 42, the mail transceiver 126 transfers the electronic mail to the mail analyzer 112 for mail analysis (step S8). The mail analysis results are transferred to the information synchronizer 108 to determine whether the update disabled state has been set in the intranet 42 (step S9). If it is determined that the update disabled state has been set in the intranet 42 in response to the update request from the intranet 41, the information 218 is updatable. The determination of whether the information 118 is in the update disabled state is already performed. A determination of whether the information 218 in the intranet 42 is updatable is performed from the mail analysis results (step S10). If it is determined that the information 218 is in the update disabled state, the releasing of the update disabled state is set (step S11) as in step S7. If it is determined that the information 218 is in the update enabled state, the information 218 is updated on the intranet 42 (step S12). To update the information, the information synchronizer 108 requests the mail generator 110 to generate an electronic mail requesting the information updating (step S13), and the electronic mail is then transmitted from the mail transceiver server 104 to the intranet 42 via the Internet 6.

The electronic mail, received by the mail transceiver 226, is transferred to the mail analyzer 212 for analysis. The controller thus confirms that the request to update the information 218 has been received. As a result, the information 218 on the intranet 42 is updated, and the information management unit 214 and the information synchronizer 208 have notified the mail generator 210 of the end of the updating. The mail generator 210 generates an electronic mail representing the end of the updating. The mail transceiver 226 transmits the electronic mail to the mail transceiver 126 in the intranet 41 via the Internet 6. The electronic mail is then analyzed by the mail analyzer 112 and the information synchronizer 108 receives a notification that the updating of the information 218 on the intranet 42 has been completed. In response to the notification, the information management unit 114 updates the information 118 (step S14). Subsequent to the information updating, the controller releases the update disabled state previously set, and shifts the intranet 41 to the update enabled state. The information management unit 114 notifies the information display and updating unit 106 of the completion of the update (step S15). The information management unit 114 thus notifies the information display and updating unit 106 that the information 118 is now in the update enabled state thereof. The process then ends.

If it is determined in step S2 that the update disabled is set, or if the update disabled state is released in step S7, or if the update disabled state is released in step S11, the information management unit 114 notifies the information display and updating unit 106 of the in completion of the updating (step S16), thereby notifying the information display and updating unit 106 that the information 118 is now in the update enabled state thereof. The process then ends.

In the above discussion, a request to update the information 118 and 218 is originated in the intranet 41. The same process is applied even if a request to update the information 118 and 218 is originated in the intranet 42.

Figure 3:
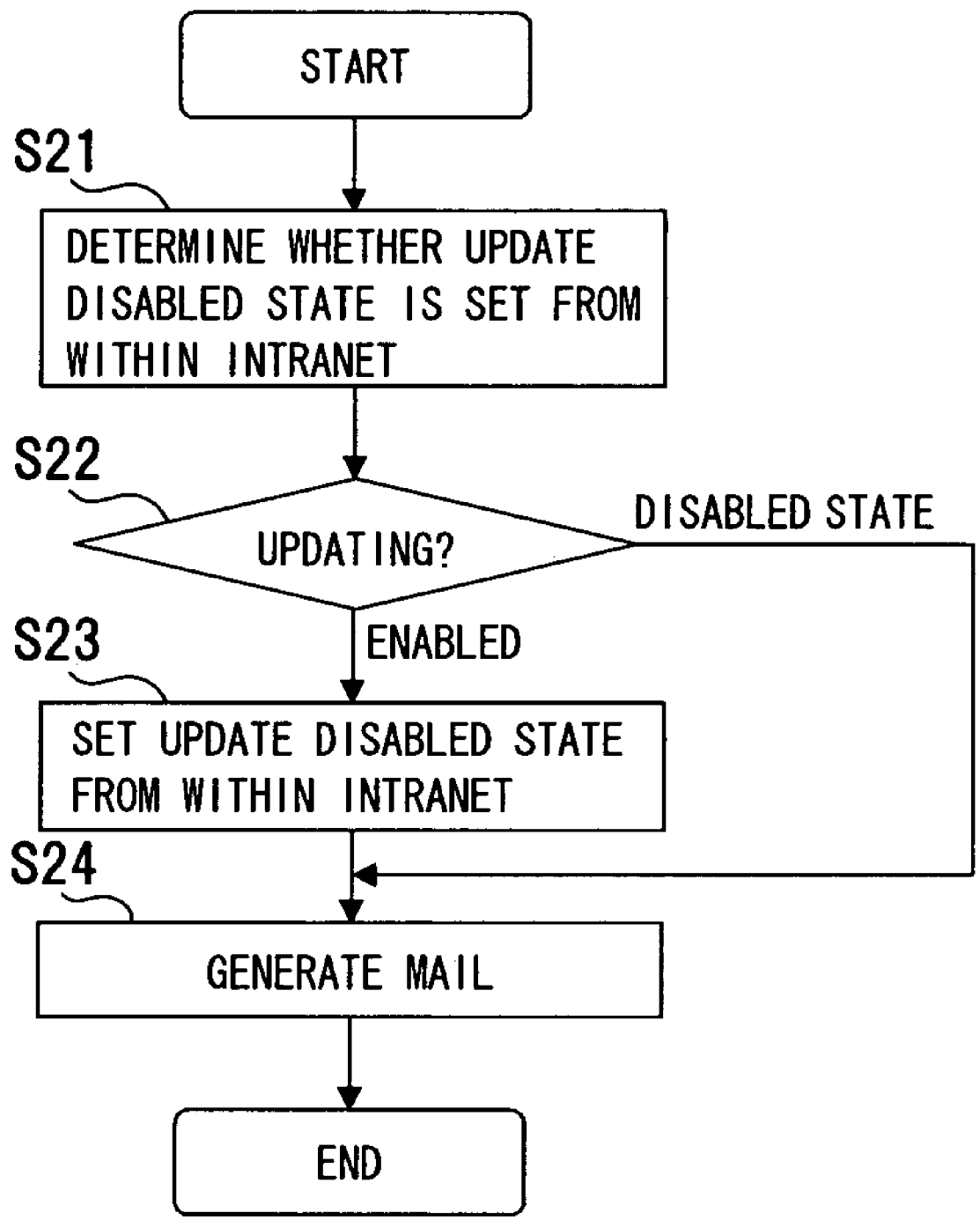
FIG. 3 is a flowchart illustrating an information processing procedure for requesting the setting of an update disabled state.

An information processing operation of the intranet that has received a request to set the update disabled state is described below with reference to FIG. 3. FIG. 3 illustrates an information processing method and an information processing program of the intranet 42 that has received a request to set the update disabled state.

When the intranet 42 receives, from the intranet 41, an electronic mail requesting the setting of the update disabled state, the electronic mail is transferred to the mail analyzer 212 from the mail transceiver 226 for analysis. The information synchronizer 208 is notified of the analysis results. The information synchronizer 208 reads the information management data 222 from the information management area 220 via the information management unit 214, and determines in step S21 whether the update disabled state is set. In the determination process, the controller determines in step S22 whether the update disabled state of the information 218 is set in the information management data 222. If it is determined that the information 218 is not in the update disabled state (namely, F=0), the update disabled state is set in the information management data 222 for the information 218 (step S23). When the update disabled state is set, the mail generator 210 generates an electronic mail notifying of the completion of the setting of the update disabled state (step S24). The electronic mail is then transmitted from the mail transceiver 226 to the intranet 41.

If the update disabled state of the information 218 is already set in the information management data 222 prior to the setting request of the update disabled state from the intranet 41, it is determined in step S22 that the update disabled state is set. More specifically, the information 218 is in the update disabled state (namely, F=1). In this case, the setting of the update disabled state cannot be repeatedly performed on the information 218. If the update disabled state cannot be set, the mail generator 210 generates an electronic mail notifying of the in completion of the setting of the update disabled state (step S24). The electronic mail is then transmitted from the mail transceiver 226 to the intranet 41.

The process of the intranet 42 having received the request to set the update disabled state has been discussed. The process of the intranet 41 having received the request to set the update disabled state remains the same.

Figure 4:
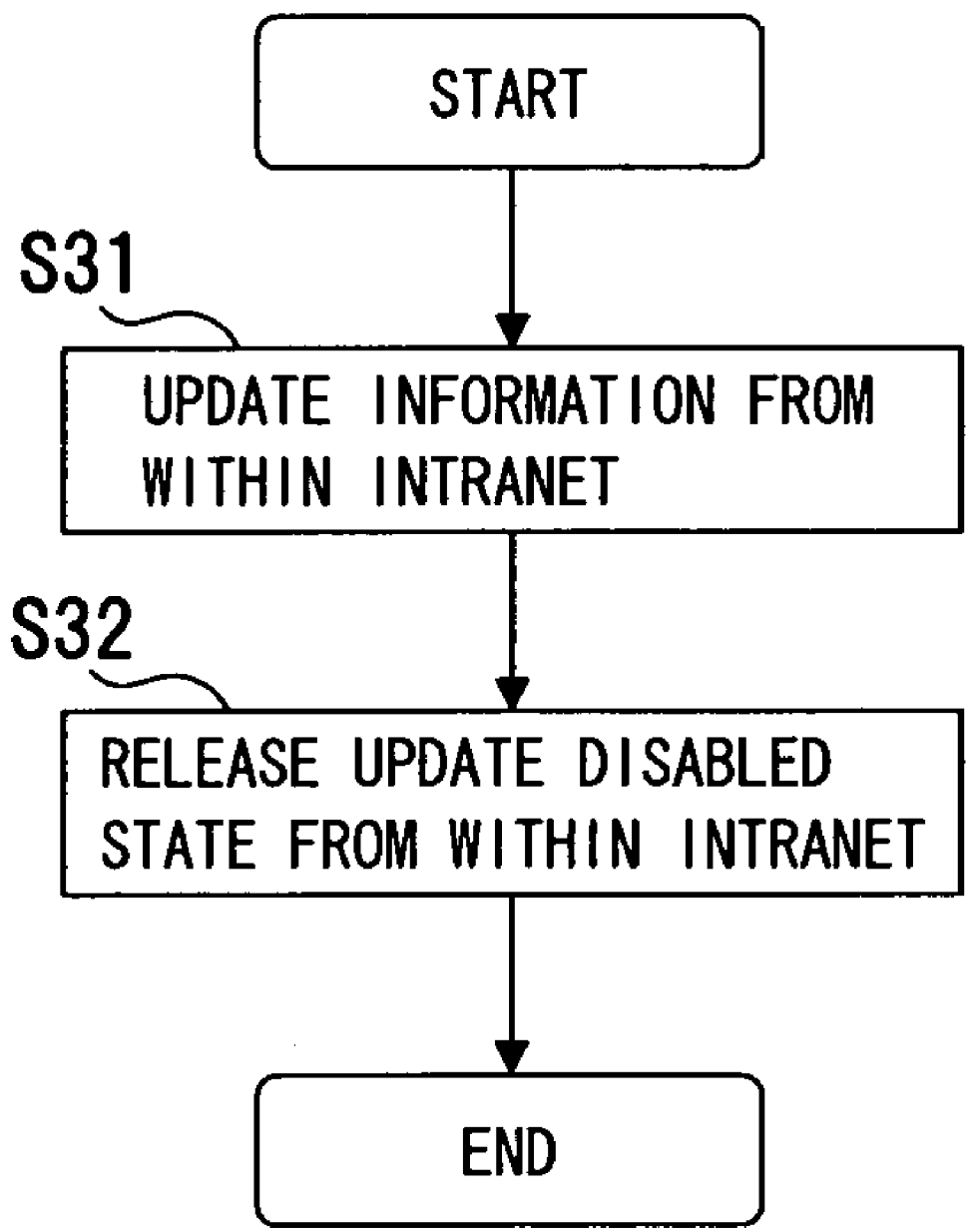
FIG. 4 is a flowchart illustrating an information updating process.

A process of the intranet 42 that has received a request to update the information is described below with reference to FIG. 4. FIG. 4 illustrates an information processing method and an information processing program, of the intranet 42 that has received the request to update the information.

The intranet 41 receives the electronic mail from the intranet 42 and the information synchronizer 108 is notified of the completion of the setting of the update disabled state. The controller in the intranet 41 determines that the information 218 in the intranet 42 is updatable. The process of updating the information 218 starts. In the information update process, the information management unit 114 having received the request to update the information 118 and the information 218 holds information "a" to be updated, corresponding to the information "A". The information management unit 114 transfers the information "a" to the mail generator 110 via the information synchronizer 108. The mail generator 110 generates an electronic mail to transmit the information "a". The electronic mail is then transmitted from the mail transceiver 126 to the intranet 42. The mail transceiver 226 receives the electronic mail via the Internet 6.

Upon receiving the electronic mail, the mail transceiver 226 in the intranet 42 transfers the electronic mail to the mail analyzer 212 for analysis. The information synchronizer 208 is notified of the analysis results, and starts an information update process on the information 218 (step S31) The information synchronizer 208 requests the information management unit 214 to update the information "A" of the information 218 in the shared information area 216 to the information "a". The information management unit 214 updates the information "A" to the information "a". Upon updating the information "A" to the information "a", the information management unit 214 releases the update disabled state of the information 218 in the intranet 42 (step S32). More specifically, the information management unit 214 shifts the information management data 222 in the information management area 220 from the update disabled state (F=1) to the update enabled state (F=0) in the information 218.

The intranet 42 notifies the intranet 41 of the completion of the updating of the information 218 by means an electronic mail. In response to the notification of the completed updating of the information 218 from the intranet 42, the information synchronizer 108 in the intranet 41 requests the information management unit 114 to update the information "A" to the information "a". The information "A" of the information 118 is updated to the information "a" in the intranet 41 as well. The information 118 is shifted from the update disabled state (F=1) to the update enabled state (F=0). For simplicity of explanation, only two intranets 41 and 42 have been discussed. If more intranets are included, replies from all other intranets sharing the information "A" are recorded. In response to the replies representing the completion of the updating, the information 118 is also updated.

The process of the intranet 42 having received the request to update the information has been discussed. The process of the intranet 41 having received, from the intranet 42, a request to update the information is also the same.

Figure 5:
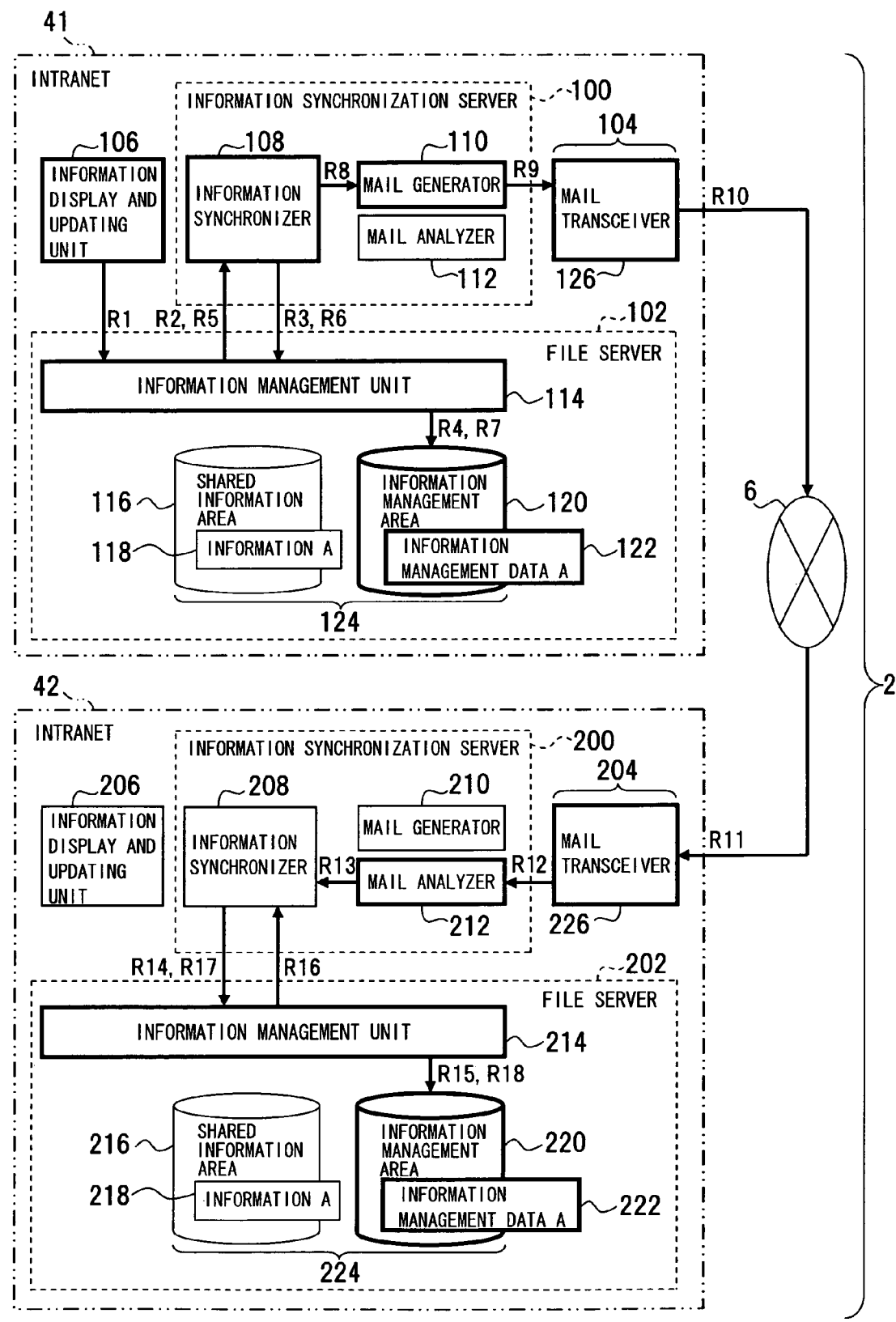
FIG. 5 is a block diagram illustrating a request process of requesting the setting of the update disabled state.
Figure 6:
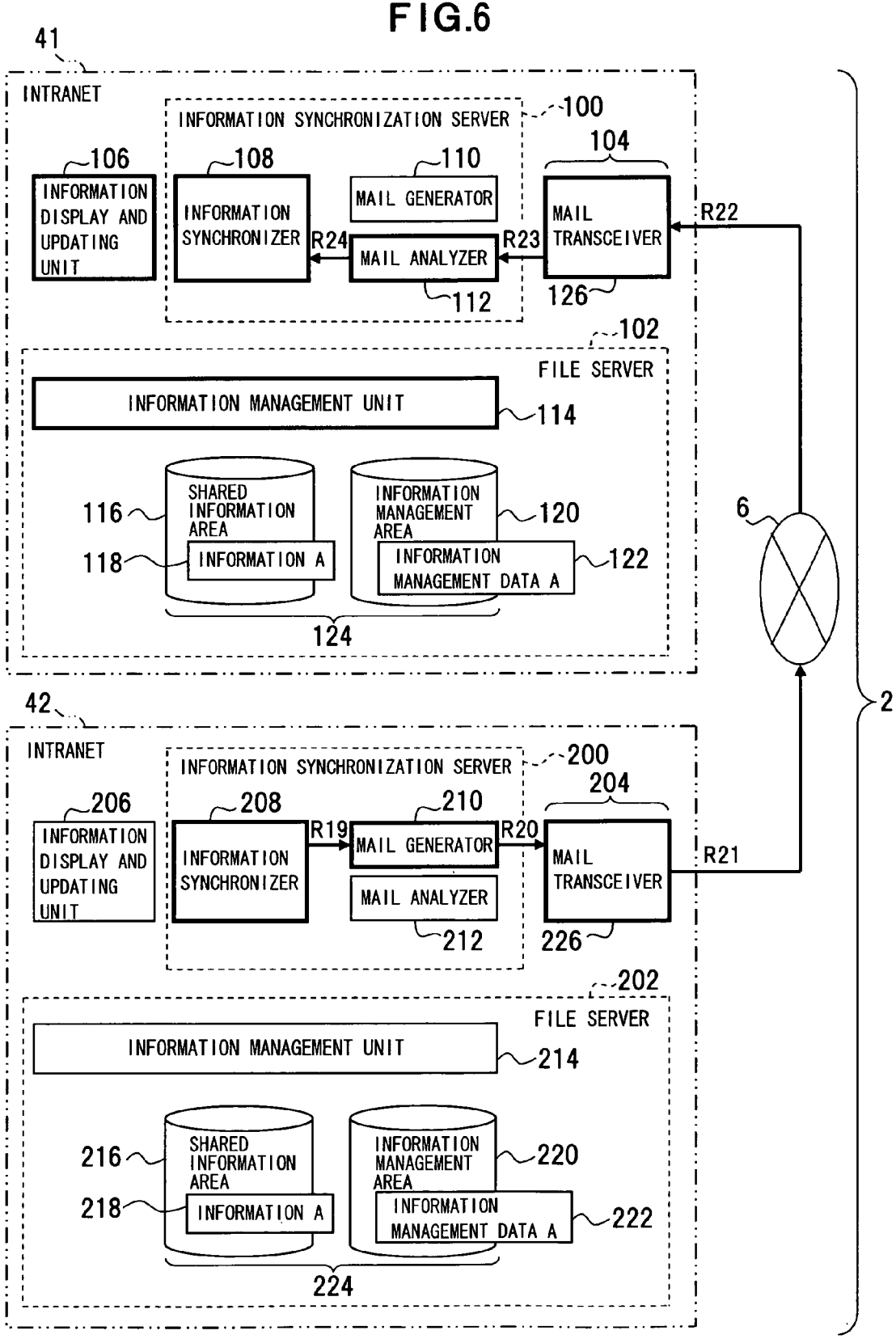
FIG. 6 is a block diagram illustrating a notification process of notifying of the end of the setting of the update disabled state.
Figure 7:
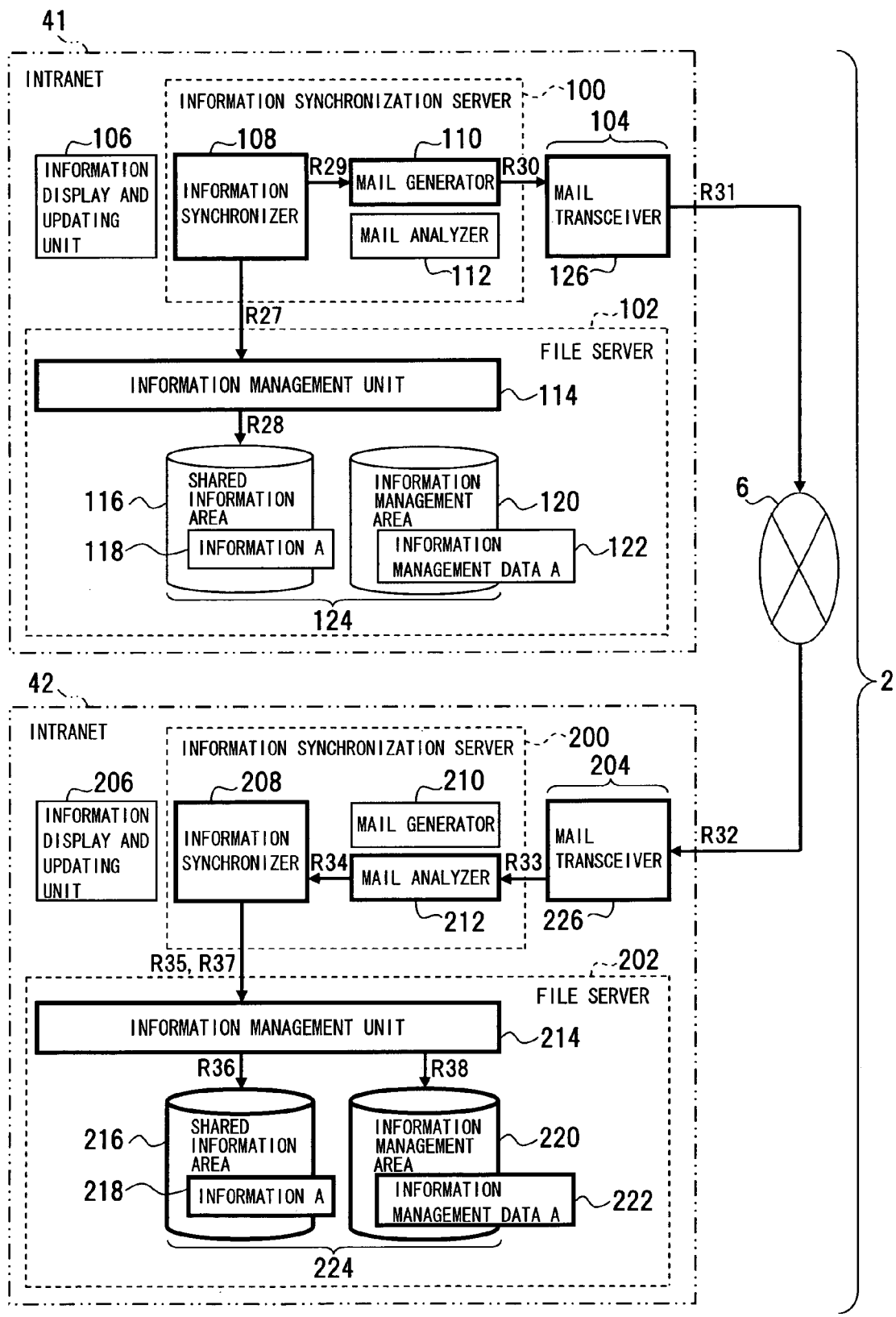
FIG. 7 is a block diagram illustrating an information updating process.
Figure 8:
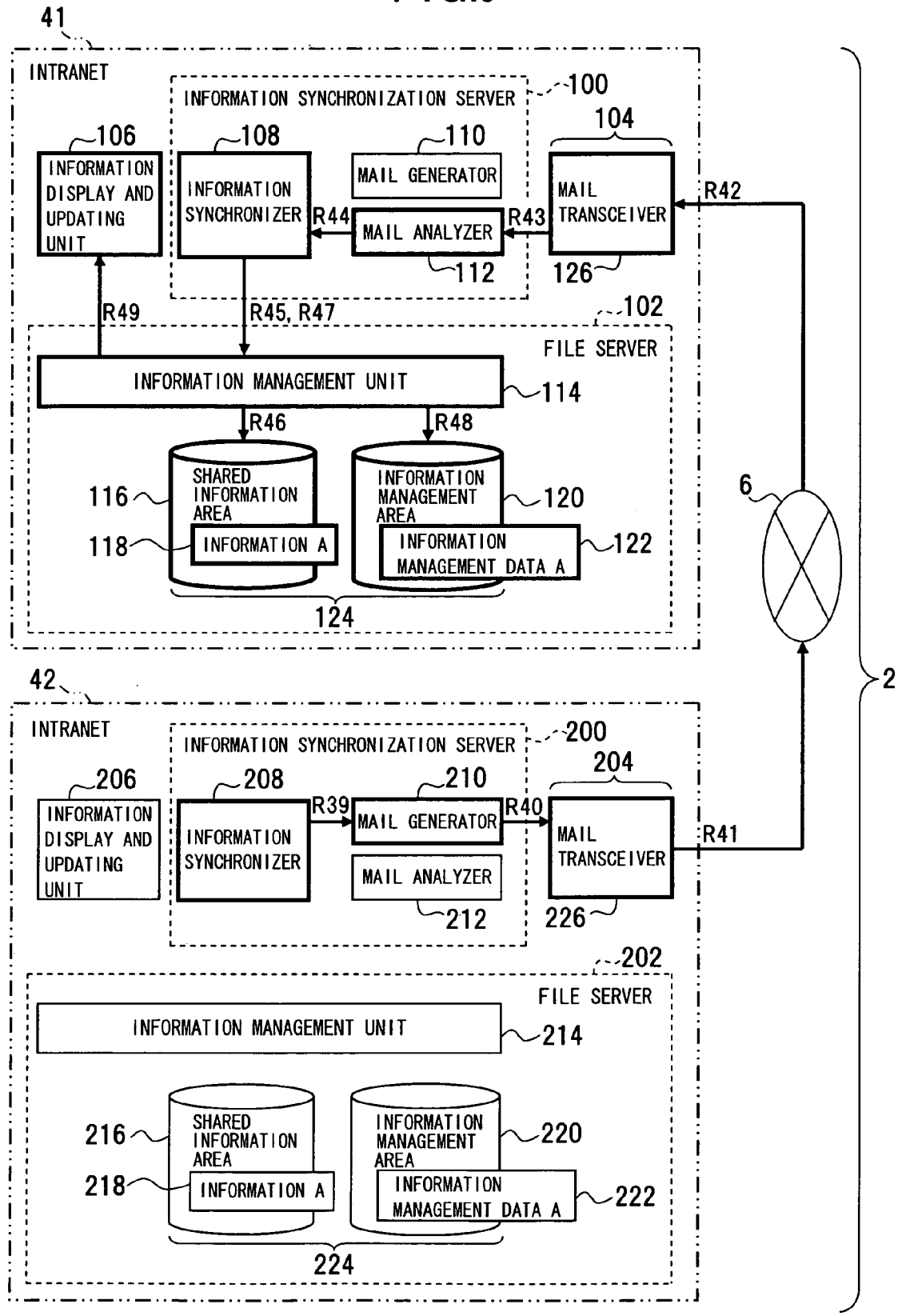
FIG. 8 is a block diagram illustrating a reply operation in the information updating process.
Figure 9:
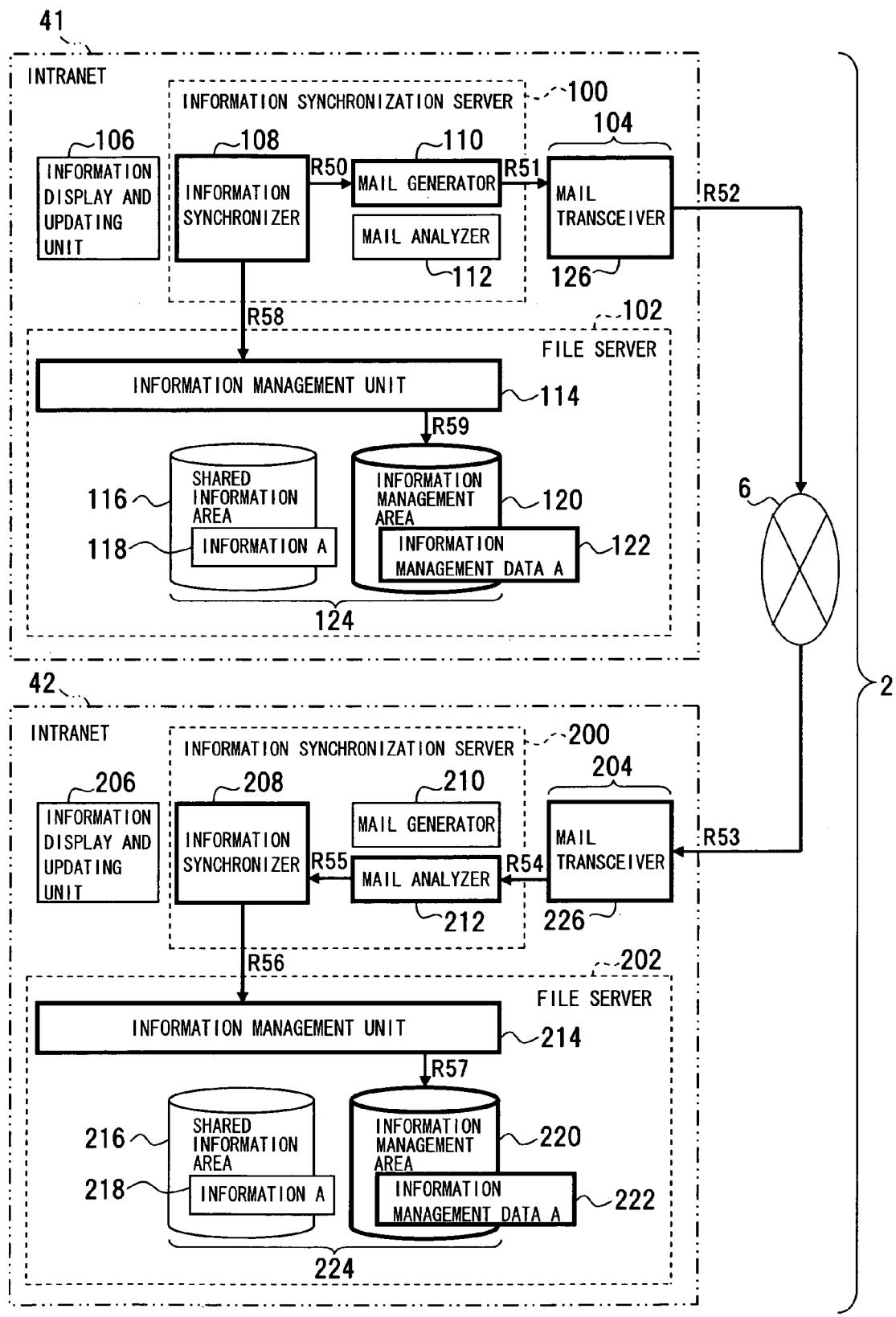
FIG. 9 is a block diagram illustrating a release process of releasing the update disabled state.

The processes performed between the intranets 41 and 42 and the elements of the intranets 41 and 42 are described with reference to FIGS. 5 through 9. FIG. 5 is a block diagram illustrating a request process of requesting the setting of the update disabled state. FIG. 6 is a block diagram illustrating a notification process of notifying of the completion of the setting of the update disabled state. FIG. 7 is a block diagram illustrating an information updating process. FIG. 8 is a block diagram illustrating a reply operation in the information updating process. FIG. 9 is a block diagram illustrating a release process of releasing the update disabled state. Elements performing major functions are shown in boxes outlined with solid line, and data flows are represented by arrow-headed solid lines.

When a request to update the information 118 occurs in the request process to set the update disabled state in the information 118 and the information 218, shared by the intranets 41 and 42, as shown in FIG. 5, the information display and updating unit 106 requests the information management unit 114 and the information synchronizer 108 to update the information 118 (arrow-headed lines R1 and R2). In response to the update request, the information synchronizer 108 requests the information management unit 114 to read the information management data 122 in the information management area 120 corresponding to the information 118 in the shared information area 116 (line R3) In response to the request, the information management unit 114 reads the information management data 122 from the information management area 120 (line R4), and notifies the information synchronizer 108 of the read information management data 122 (line R5). The information management unit 114 determines whether the update disabled state is set in the information management data 122 concerning the information 118. If it is determined that the update disabled state is set (F=1), the updating is currently in progress. The information management unit 114 is notified that another request to update the information is unacceptable, i.e., that the information 118 cannot be updated. The information management unit 114 then notifies the information display and updating unit 106 that the information 118 cannot be updated.

If it is determined that the update disabled state is not set in the information management data 122 (F=0), the information synchronizer 108 requests the information management unit 114 to set the update disabled state (line R6) In response to the request, the update disabled state is set in the information management data 122 (F=1) (line R7). In accordance with the setting, the information synchronizer 108 requests the mail generator 110 to transmit, to the intranet 42 sharing the information 118, a request to set the update disabled state (line R8). If another intranet sharing the information 118 is present other than the intranet 42, the information synchronizer 108 also requests the mail generator 110 to transmit the same request to that intranet. The mail generator 110 generates the electronic mail for setting the update disabled state, and requests the mail transceiver 126 to transmit the electronic mail (line R9). The mail transceiver 126 transmits the electronic mail to the intranet 42 (R10).

The mail transceiver 226 in the intranet 42 receives the electronic mail via the Internet 6 (line R11). The electronic mail is then transferred to the mail analyzer 212 (line R12) for analysis. The analysis results, provided by the mail analyzer 212, are then transferred to the information synchronizer 208 (line R13). The information synchronizer 208 performs a determination process of determining whether the update disabled state is set. More specifically, the information synchronizer 208 requests the information management unit 214 to read the information management data 222 (line R14). The information management data 222 is read from the information management area 220 (line R15). The information management data 222 is transferred to the information synchronizer 208 via the information management unit 214 (line R16). The information synchronizer 208 requests the information management unit 214 to set the update disabled state in the information management data 222 in the information management area 220 (line R17). The update disabled state is then set in the information management data 222 (line R18).

The completion notification process relating to setting the update disabled state of the information 218 shared by the intranets 41 and 42 is performed as shown in FIG. 6. When the setting of the update disabled state is complete in FIG. 5, the system shifts to the completion notification process. The information synchronizer 208 notifies the mail generator 210 of the completion of the setting of the update disabled state (line R19). In response, the mail generator 210 generates an electronic mail representing the completion of the setting of the update disabled state, and requests the mail transceiver 226 to transmit the electronic mail (line R20). The electronic mail is then transmitted from the mail transceiver 226 (line R21). The mail transceiver 126 in the intranet 41 receives the electronic mail via the Internet 6 (line R22). The electronic mail is then transferred to the mail analyzer 112 for analysis (line R23). The analysis results are then transferred to the waiting information synchronizer 108 (line R24). A notification of an aborted setting is also transmitted in a similar manner.

In the information update process shown in FIG. 7, the information synchronizer 108 requests the information management unit 114 to acquire the information "a", to be updated, from the information 118 (line R27). In response to the request, the information management unit 114 acquires, from the shared information area 116, the information "a" to be updated (line R28), and notifies the information synchronizer 108 of the information "a". The information synchronizer 108 notifies the mail generator 110 of the information updating to the intranet sharing the information "A" (line R29). In response to the notification, the mail generator 110 generates an electronic mail stating the updating of the information "A" to the information "a", and requests the mail transceiver 126 to transmit the electronic mail (line R30). The electronic mail is then transmitted from the mail transceiver 126 (line R31) The mail transceiver 226 in the intranet 42 receives the electronic mail via the Internet 6 (line R32). The received electronic mail is then transferred to the mail analyzer 212 for analysis (line R33). The analysis results are then transferred to the information synchronizer 208 (line R34). The information synchronizer 208 requests the information management unit 214 to update the information "A" to the information "a" in the information 218 (line R35). The information management unit 214 thus updates the information "A" to the information "a" in the information 218 in the shared information area 216 (line R36). The information synchronizer 208 requests the information management unit 214 to shift the information management data 222 from the update disabled state to the update enabled state (line R37). In response to the request, the information management unit 214 shifts the information management data 222 in the information management area 220 from the update disabled state (F=1) to the update enabled state (F=0) (line R38).

In the reply process of the information updating shown in FIG. 8, the information synchronizer 208 requests the mail generator 210 to notify of the completion of the information updating (line R39) after the information update process. In response to the request, the mail generator 210 generates an electronic mail notifying of the completion of the information updating. The mail generator 210 requests the mail transceiver 226 to transmit the electronic mail (line R40). The electronic mail is then transmitted from the mail transceiver 226 (line R41). The mail transceiver 126 in the intranet 41 receives the electronic mail via the Internet 6 (line R42). The electronic mail is transferred to the mail analyzer 112 for analysis (line R43). The analysis results are transferred to the information synchronizer 108 (line R44). The information synchronizer 108 requests the information management unit 114 to update the information "A" to the information "a" in the information 118 (line R45). The information management unit 114 updates the information "A" to the information "a" in the information 118 in the shared information area 116 (line R46). The information synchronizer 108 requests the information management unit 114 to shift the information management data 122 from the update disabled state to the update enabled state (line R47). In response to the request, the information management unit 114 shifts the information management data 122 in the information management area 120 from the update disabled state (F=1) to the update enabled state (F=0) (line R48). The information management unit 114 then notifies the information display and updating unit 106 of the completion of the information updating (line R49).

The releasing process of the update disabled state of the information is performed as shown in FIG. 9. Upon receiving the notification of the in completion of the setting of the update disabled state, the information synchronizer 108 notifies the mail generator 110 of the releasing of the update disabled state to an intranet having completed the setting of the update disabled state; from among the intranets sharing the information 118 in the shared information area 116 in the intranet 41 (line R50). In response to the notification, the mail generator 110 generates an electronic mail representing the releasing of the update disabled state, and requests the mail transceiver 126 to transmit the electronic mail (line R51). In response to the request, the mail transceiver 126 transmits the electronic mail (line R52). The mail transceiver 226 in the intranet 42 receives the electronic mail via the Internet 6 (line R53). The received electronic mail is transferred to the mail analyzer 212 for analysis (line R54). As a result of the analysis, the mail analyzer 212 notifies the information synchronizer 208 of the request to release the update disabled state (line R55) The information synchronizer 208 requests the information management unit 214 to release the update disabled state in the information management data 222 in the information management area 220 corresponding to the information 218 in the shared information area 216 in the intranet 42 (line R56). In response to the request, the information management unit 214 releases the update disabled state in the information management data 222 in the information management area 220 (to F=0) (line R57)

The information synchronizer 108 in the intranet 41 requests the information management unit 114 to release the update disabled state in the information management data 122 in the information management area 120 corresponding to the information 118 in the shared information area 116 (line R58). In response to the request, the information management unit 114 releases the update disabled state (F=1) in the information management data 122 in the information management area 120 to the update enabled state (F=0) (line R59).

Figure 10:
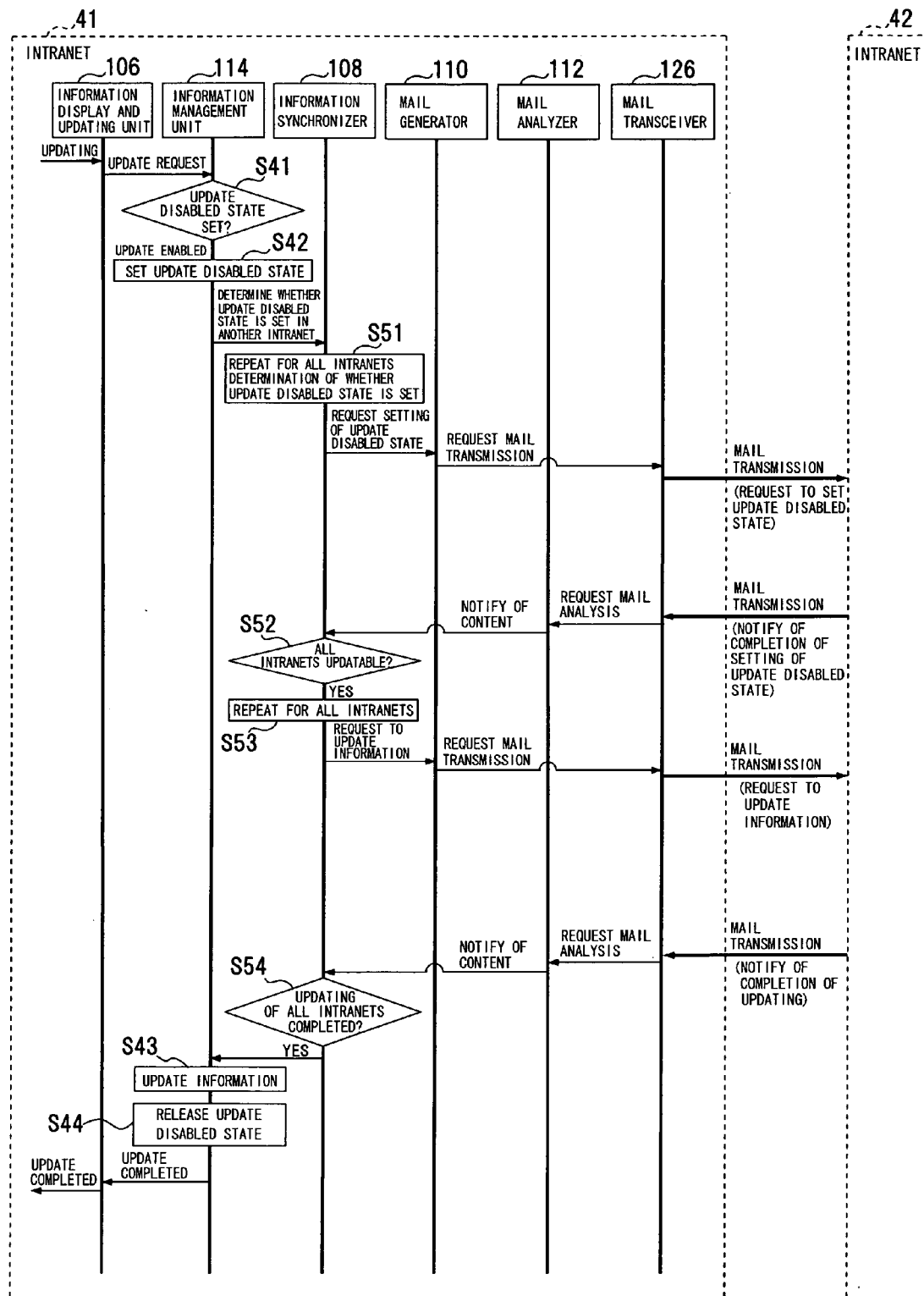
FIG. 10 illustrates a normal process sequence performed between intranets.
Figure 11:
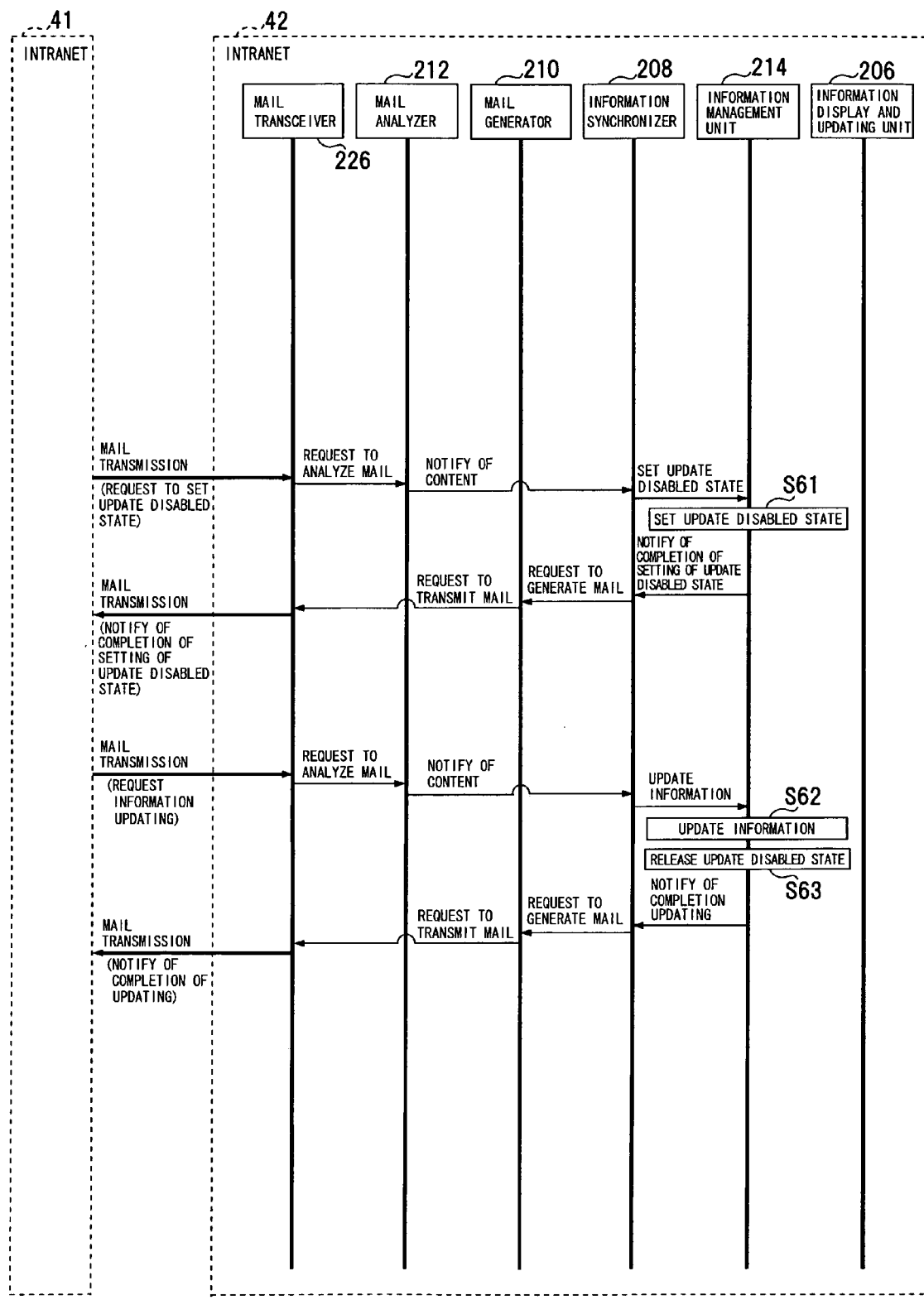
FIG. 11 illustrates a normal process sequence performed between the intranets.

The above-referenced information processing sequence is described with reference to FIGS. 10 and 11. FIGS. 10 and 11 illustrate the process sequence performed between the intranets 41 and 42.

Upon receiving an information update request, the information display and updating unit 106 in the intranet 41 notifies the information management unit 114 of the information update request. In response to the request, the information management unit 114 determines in step S41 whether the update disabled state is set. If it is determined that the update enabled state is set, the information management unit 114 sets the update disabled state (step S42). If another intranet is present other than the intranets 41 and 42, the information management unit 114 determines in all other intranets in step S51 whether the update disabled state is set. The information management unit 114 notifies the information synchronizer 108 of the determination results concerning the update disabled state. The determination process and the notification of the determination result are repeated for all intranets. The information synchronizer 108 notifies the mail generator 110 of the request to set the update disabled state. The mail generator 110 generates an electronic mail notifying of the request to set the update disabled state, and requests the mail transceiver 126 to transmit the electronic mail. The request to set the update disabled state is thus issued from the intranet 41 to the intranet 42 by the mail transmission as shown in FIG. 11.

The mail transceiver 226 in the intranet 42 receives the electronic mail via the Internet 6. The mail transceiver 226 issues a mail analysis request to the mail analyzer 212. The mail content, analyzed by the mail analyzer 212, is transferred to the information synchronizer 208. The information synchronizer 208 notifies the information management unit 214 of the request to set the update disabled state. The information management unit 214 sets the update disabled state (step S61), and notifies the information synchronizer 208 of the completion of the setting of the update disabled state subsequent to the setting of the update disabled state. In response to the request, the information synchronizer 208 issues a mail generation request to the mail generator 210. The mail generator 210 generates an electronic mail representing the completion of the setting of the update disabled state. The mail generator 210 requests the mail transceiver 226 to transmit the electronic mail. The electronic mail is transmitted to the intranet 41 as shown in FIG. 10.

The mail transceiver 126 in the intranet 41 receives the electronic mail via the Internet 6. The mail transceiver 126 issues a mail analysis request to the mail analyzer 112. The mail content, analyzed by the mail analyzer 112, is Transferred to the information synchronizer 108. Upon receiving the notification of the completion of the setting of the update disabled state, the information synchronizer 108 determines for all intranets in step S52 whether the update disabled state is set. This process is repeated for all intranets (step S53).

In response to an information update request from the information synchronizer 108, the mail generator 110 generates an electronic mail, and then requests the mail transceiver 126 to transmit the electronic mail. The electronic mail requesting the information update is transmitted to the intranet 42 (FIG. 11).

The mail transceiver 226 in the intranet 42 receives the electronic mail via the Internet 6. The mail transceiver 226 issues a mail analysis request to the mail analyzer 212. The mail content, analyzed by the mail analyzer 212, is transferred to the information synchronizer 208. The information synchronizer 208 notifies the information management unit 214 of the request to update the information, and the information management unit 214 updates the information (step S62). After the information updating, the information management unit 214 releases the update disabled state (step S63), and the information management unit 214 issues a notification of the completion of the information updating to the information synchronizer 208. The information synchronizer 208 issues a mail generation request to the mail generator 210. The mail generator 210 generates an electronic mail notifying of the completion of the information updating, and transfers a mail transmission request to the mail transceiver 226. The electronic mail is then transmitted from the mail transceiver 226 to the intranet 41 as shown in FIG. 10.

In response to the mail analysis request from the mail transceiver 126, and the notification of the analysis results of the mail analyzer 112, the information synchronizer 108 determines in step S54 whether the information updating has been completed in all intranets. This process is repeated for all intranets. The releasing of the update disabled state is performed (step S44) after the information management unit 114 completes the information update process (step S43) in the intranet 41. The information display and updating unit 106 is notified of the completion of the information updating, and an indication of the completion of the information update is displayed on the information display and updating unit 106.

Figure 12:
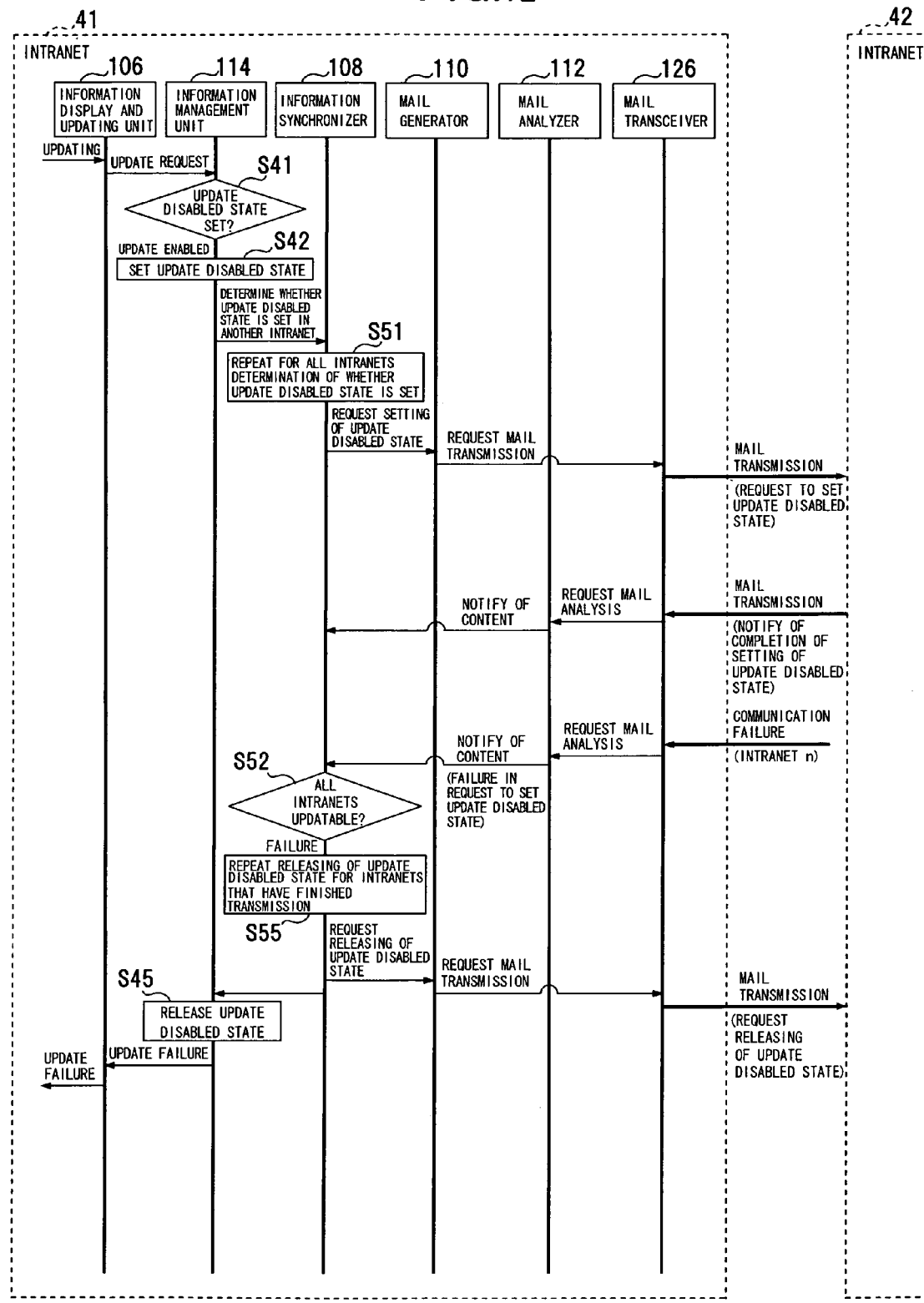
FIG. 12 illustrates a process sequence during communication failure.
Figure 13:
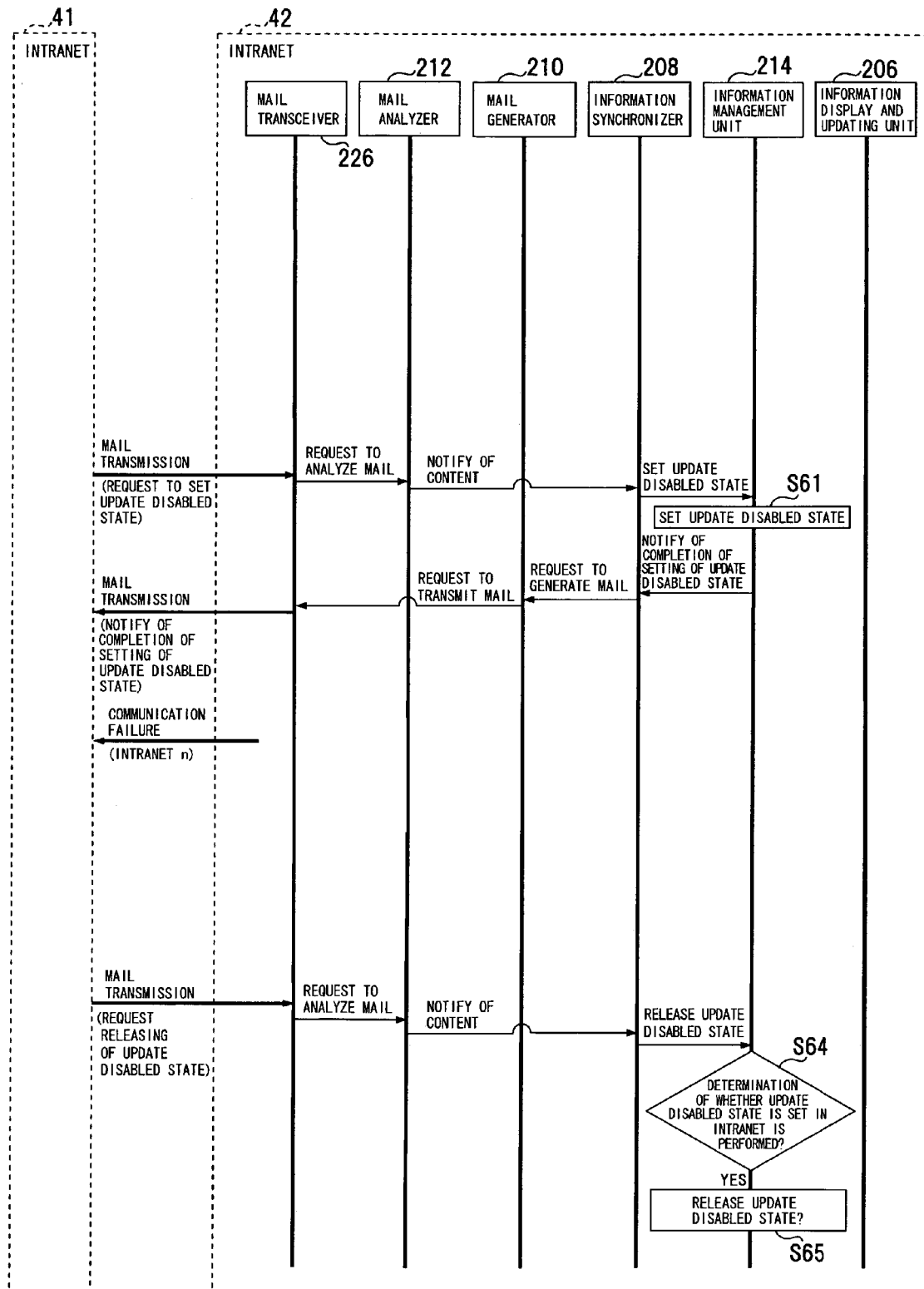
FIG. 13 illustrates a process sequence during the communication failure.

A process sequence in the case of a communication failure is described below with reference to FIGS. 12 and 13. FIGS. 12 and 13 illustrates an example of the process sequence performed between the intranets 41 and 42.

As previously discussed with reference to FIGS. 10 and 11, the setting of the update disabled state is normally performed in the intranet 42 in response to the information update request from the intranet 41 and the intranet 41 receives the notification of the completion of the setting of the update disabled state from the intranet 42. If an intranet "n", other than the intranet 42, sharing the information, is present, and an electronic mail from the intranet "n" shows that an analysis result is a failure, and that the updating of all intranets is a failure (step S52), the update disabled state of the information is released. This process is repeated for the intranets that have transmitted the electronic mail (step S55). In response, the information management unit 114 releases the previously set update disabled state (step S45) as a result of an update failure. An indication of such an update failure is displayed on the information display and updating unit 106 to so notify a user.

The intranet 42 is also notified of the request to release the update disabled state. In response to the electronic mail, the intranet 42 determines in step S64 whether the update disabled state is set in the information management unit 214. If it is determined that the update disabled state is set, the information management unit 214 releases the update disabled state (step S65) to end the communication failure process.

In the case of the communication failure, discrepancy between the information 118 in the intranet 41 and the information 218 in the intranet 42 is avoided by forcing the information update. The reliability of the information 118 and the information 218 is thus maintained.

Figure 14:
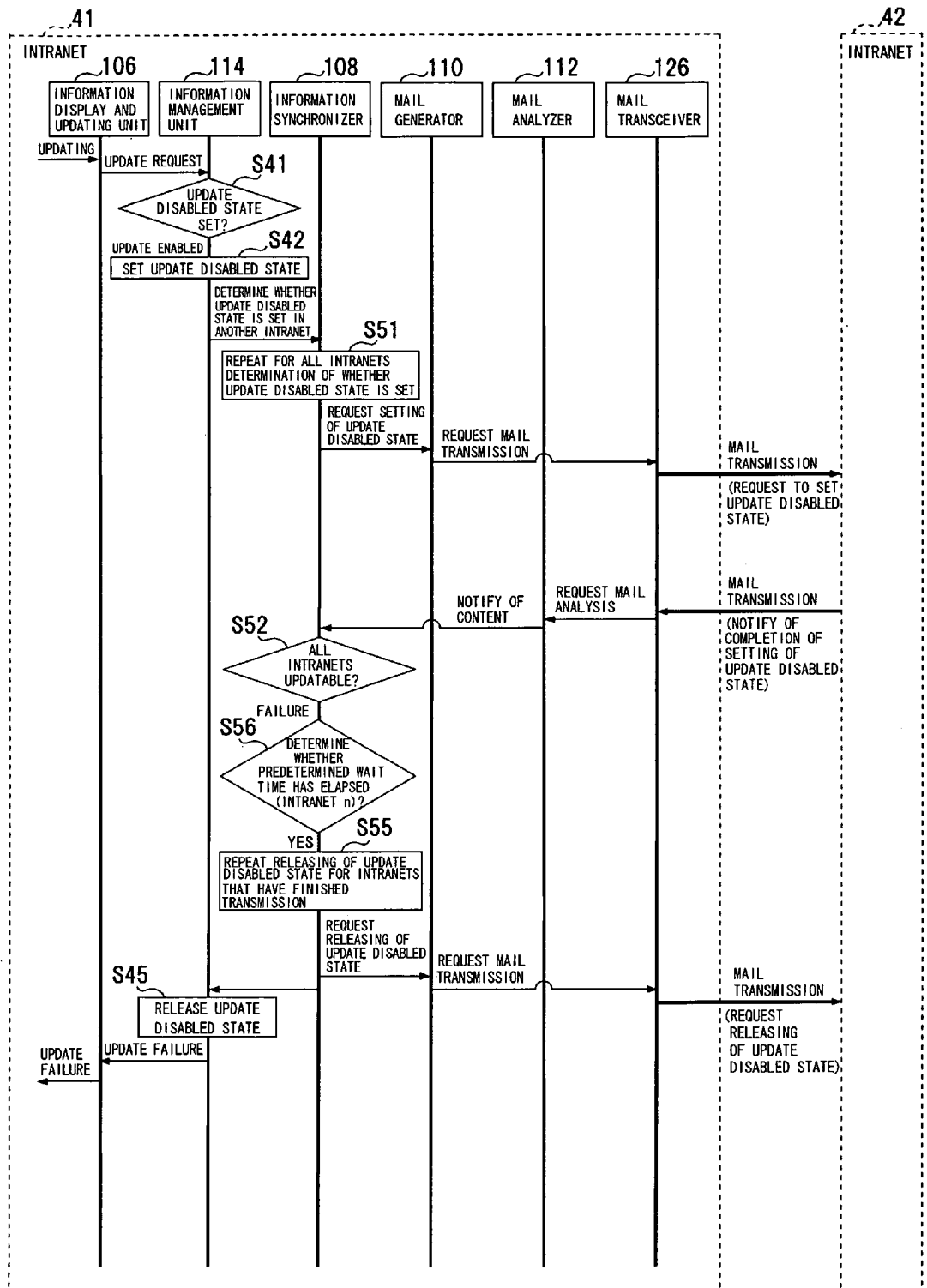
FIG. 14 illustrates a process sequence performed at time-out.
Figure 15:
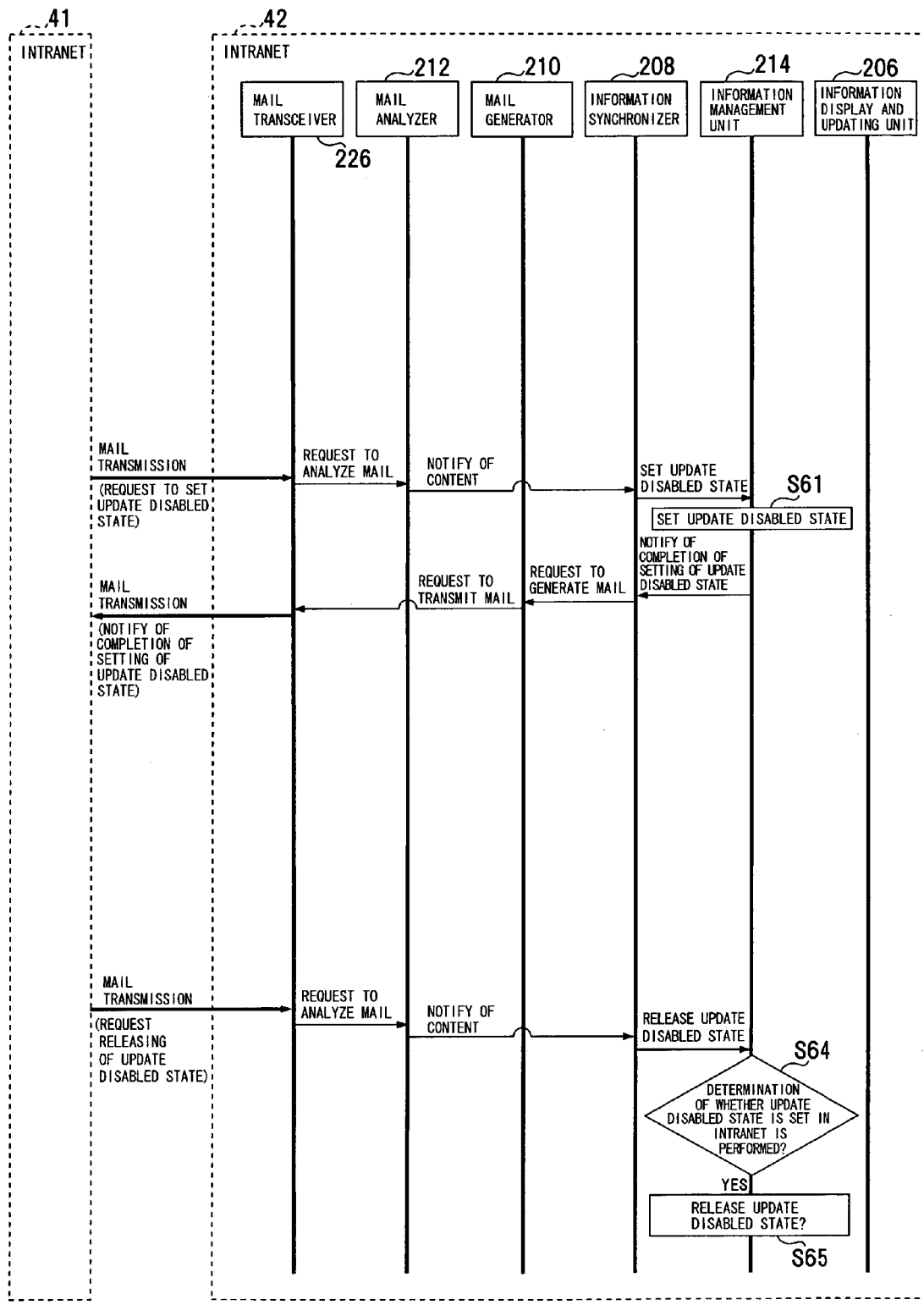
FIG. 15 illustrates the process sequence performed at the time-out.

A process sequence of the information update process with time limit applied thereto is described below with reference to FIGS. 14 and 15. FIGS. 14 and 15 illustrate the process sequence performed between the intranets 41 and 42.

The intranet 41 issues an information update request. The update disabled state is set in the intranet 41 and the intranet 42. The same process is performed on all other intranets. When a wait time is prolonged, the information synchronizer 108 determines in step S56 whether a predetermined wait time has elapsed. If the intranet "n" fails to complete the setting of the update disabled state within the predetermined time, the information synchronizer 108 stops the update process in the middle thereof because of time out. In this case, as well, the intranet 41 requests the intranet 42 to release the update disabled state. When the update disabled state is released in the intranet 42, the update disabled state set in the information management data 122 by the information management unit 114 is also released.

With the time limit (timeout) introduced in the update process, a delay in the information update process in the intranets 41 and 42 is prevented. The information processing is thus speeded up.

Figure 16:
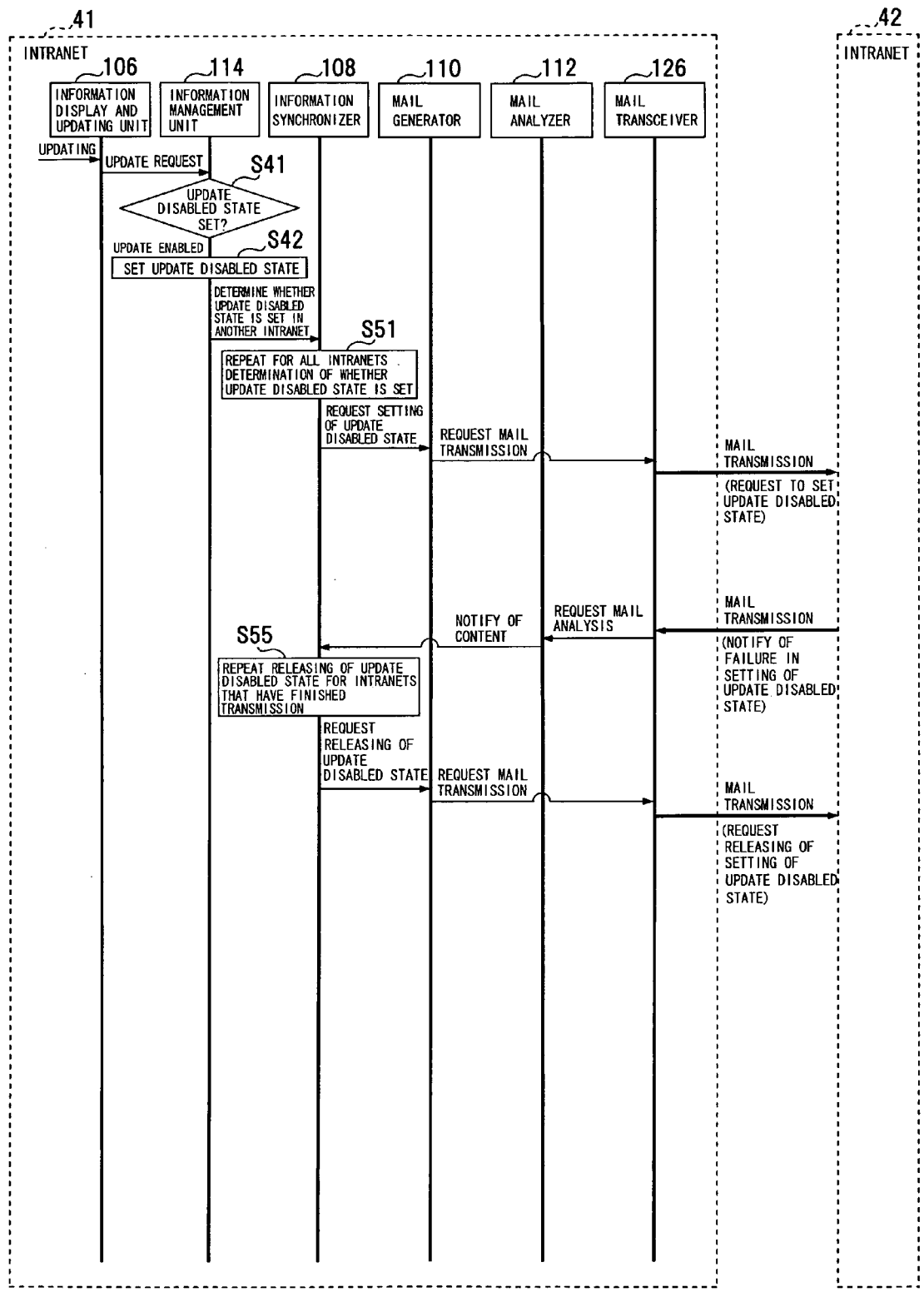
FIG. 16 illustrates a process sequence during information update contention.
Figure 17:
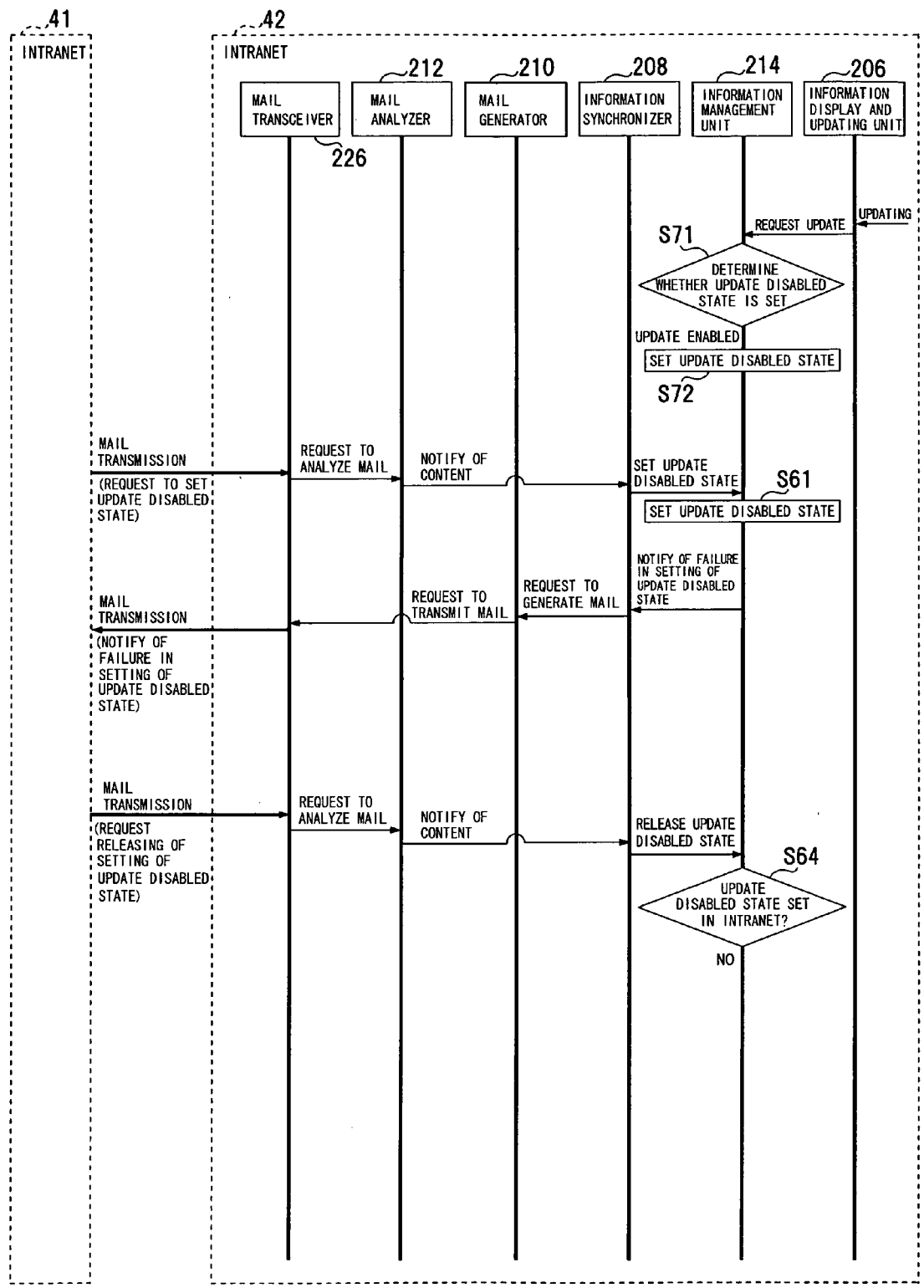
FIG. 17 illustrates the process sequence during the information update contention.

A process sequence of the information update process in the case of update contention is described below with reference to FIGS. 16 and 17. FIGS. 16 and 17 illustrate the process sequence with the intranets 41 and 42 contending for the update process.

An update request originated in the intranet 41 (FIG. 16) and an update request originated in the intranet 42 (FIG. 17) can occur in tandem. For example, in such a case, the intranet 41 determines in step S41 whether the update disabled state is set, and sets the update disabled state in step S42. A determination of whether the update disabled state is set is performed on all intranets, and the request to set the update disabled state is issued to the intranet 42. An information update request is then originated in the intranet 42, and the information management unit 214 determines in step S71 whether the update disabled state is set, and sets the update disabled state in step S72. If the process performed in the intranet 42 precedes in time the process in the intranet 41, the notification that the update disabled state cannot be set is transmitted from the intranet 42 to the intranet 41 even when the update disabled state is set in the intranet 42 in response to the request to set the update disabled state from the intranet 41.

The information synchronizer 108 in the intranet 41 issues a request to release the update disabled state, and an electronic mail requesting to release the update disabled state is transmitted to the intranet 42. The intranet 42 receives the request to release the update disabled state, and the update disabled state is then released. The update process in the intranet 42 thus precedes. As a result, the update request from the intranet 41 is not accepted. More specifically, if the update requests are concurrently originated in the intranets 41 and 42, the update process is performed on one intranet that has set the update disabled state. This arrangement prevent information discrepancy when the intranets 41 and 42 contend for update requesting. The inconvenience due to information update contention is thus avoided.

For example, the update disabled state is set in a plurality of intranets including the intranets 41 and 42 when the request to release the update disabled state is received. An intranet requesting to release the update disabled state is identified. If that intranet is the one that has set the update disabled state, the update disabled state is released. If that intranet is other than the one that has set the update disabled state, the reception of the request to release the update disabled state is avoided. In this way, the information update contention is precluded.

Figure 18:
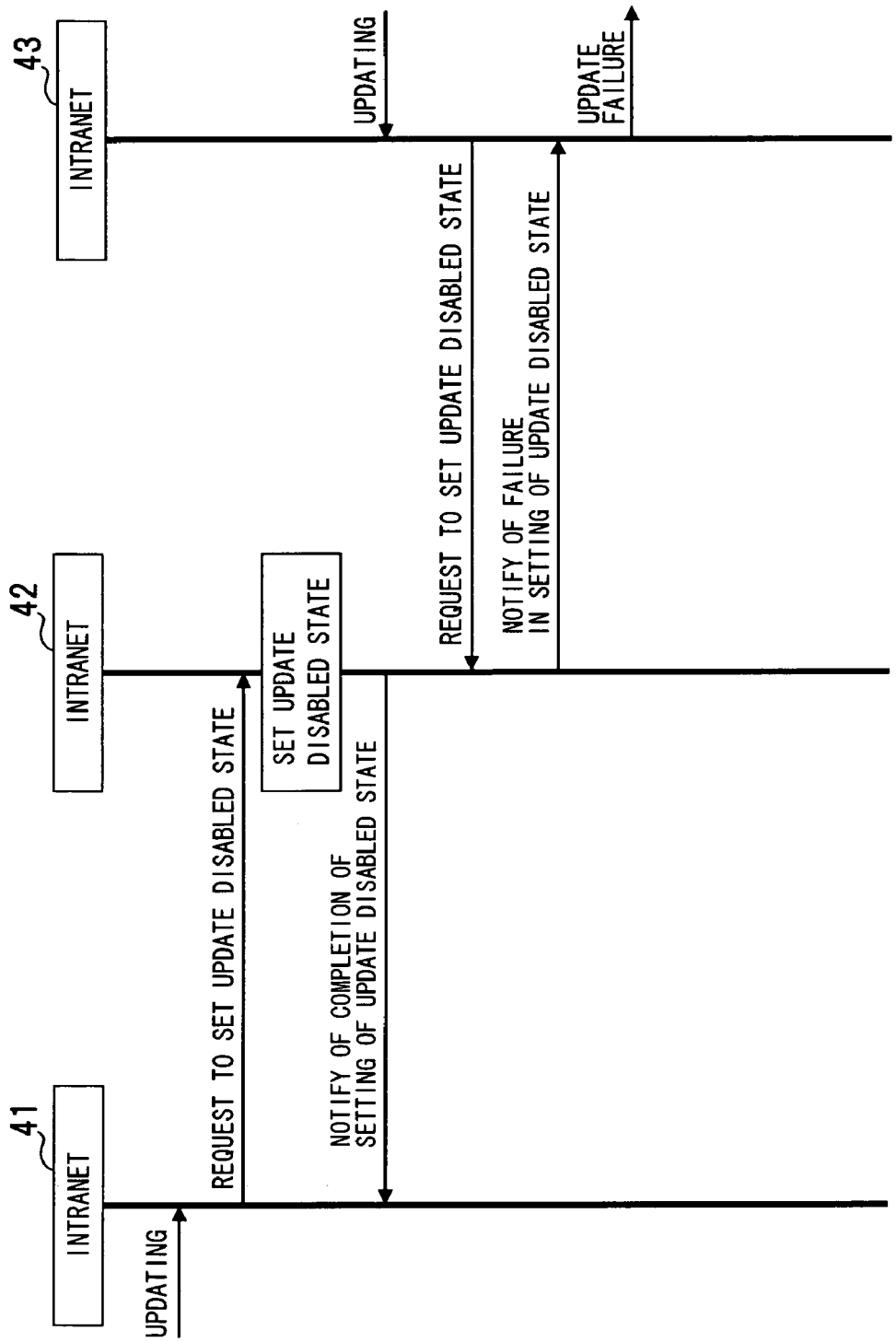
FIG. 18 illustrates a process sequence to avoid information update contention.
Figure 19:
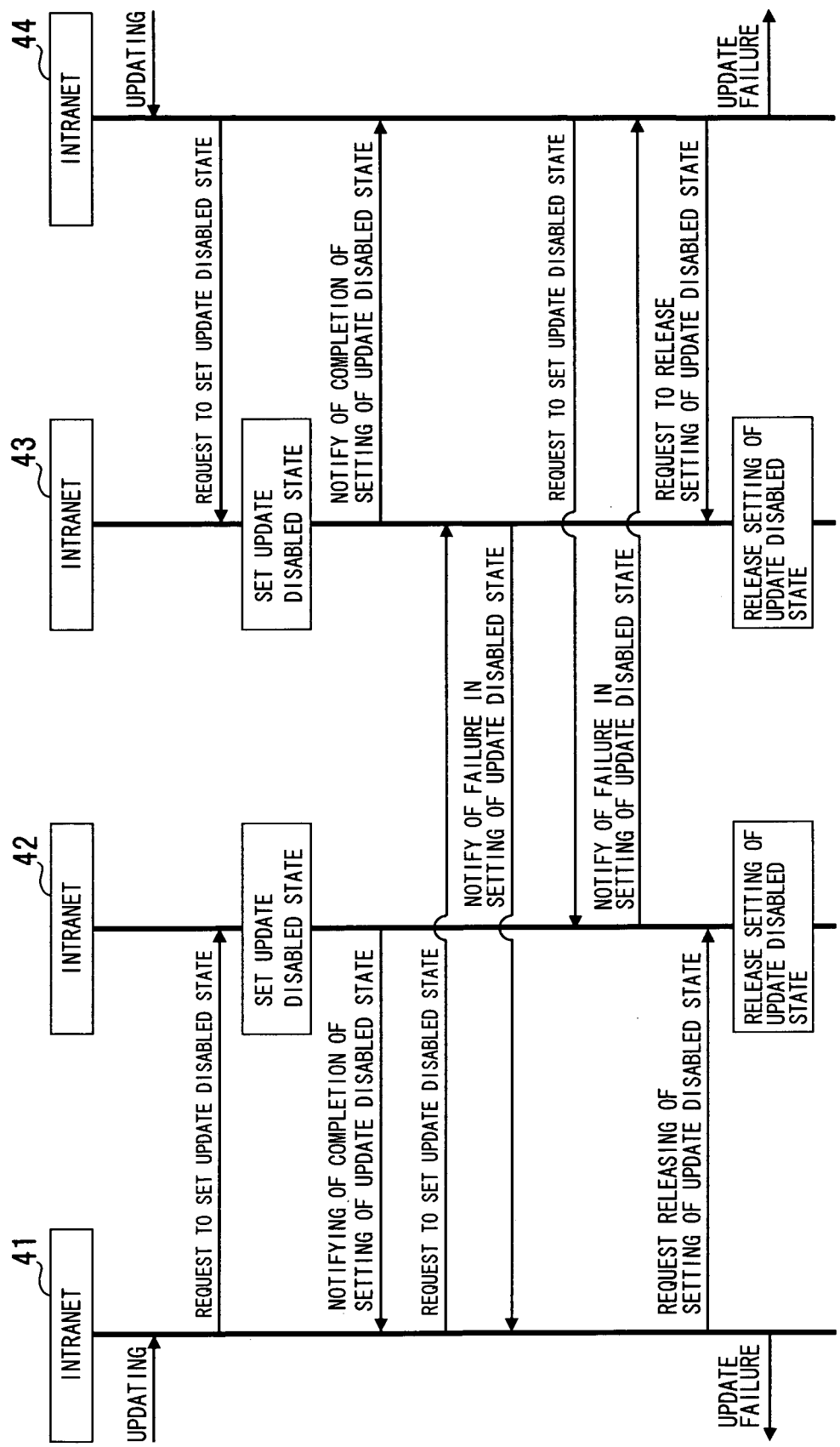
FIG. 19 illustrates the process sequence to avoid the information update contention.
Figure 20:
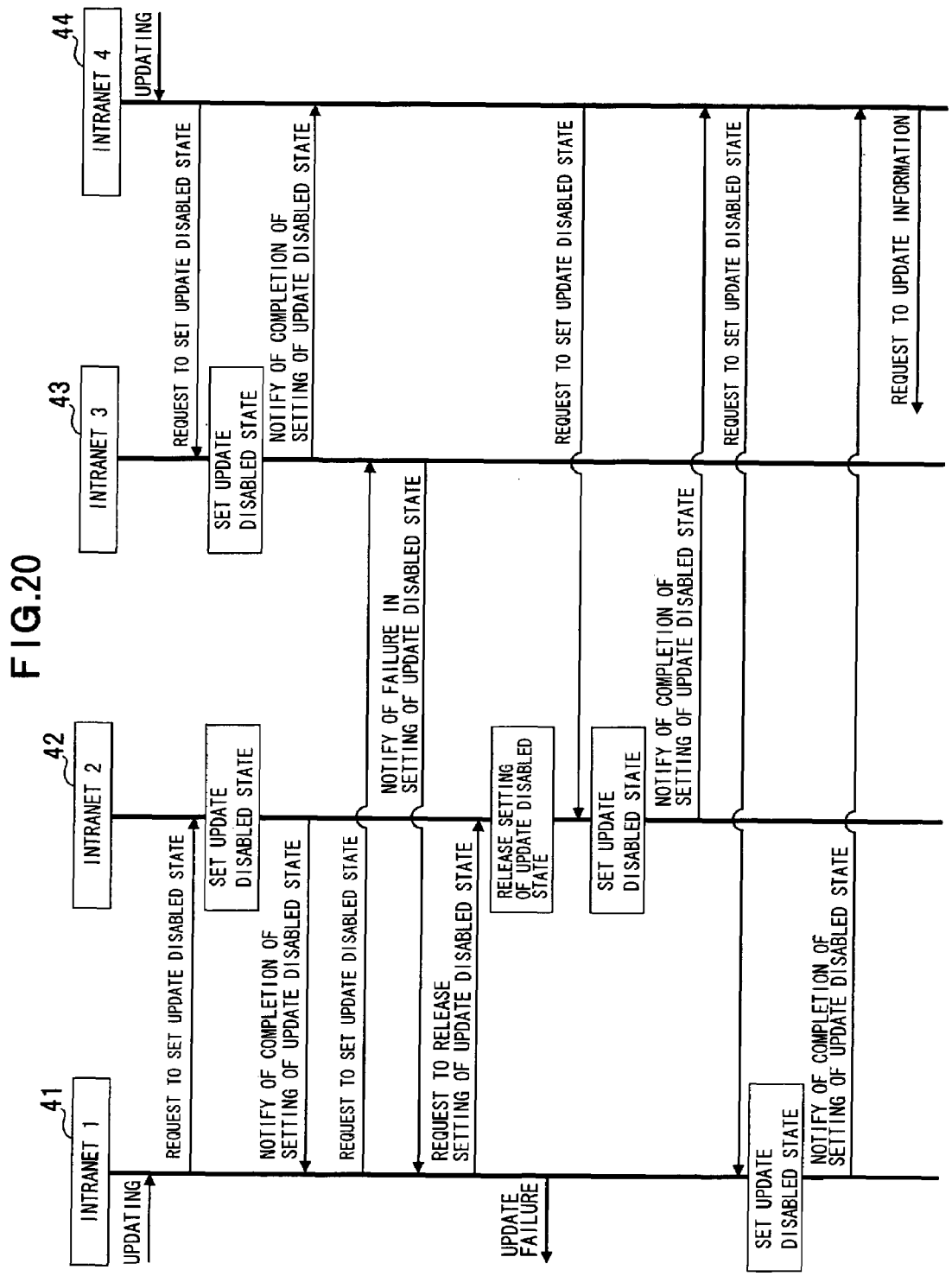
FIG. 20 illustrates the process sequence to avoid the information update contention.

A mechanism and a process of avoiding information update contention between the intranets are described below with reference to FIGS. 18 through 20. FIG. 18 illustrates a process sequence for avoiding the information update contention in three intranets. FIGS. 19 and 20 illustrate a process sequence for avoiding the information update contention in four intranets.

As shown in FIG. 18, requests to update information shared by intranets 41 through 43 are originated in the intranets 41 and 43. Each of the intranets 41 and 43 requests the intranet 42 to set the update disabled state. When the intranet 42 receives the request to set the update disabled state from the intranet 41 first, the update disabled state is set in the intranet 42 and the request to set the update disabled state from the other intranet, namely, the intranet 43 is rejected. In response to the request to set the update disabled state from the intranet 43, the intranet 42 transmits, to the intranet 43, a notification that the update disabled state is not set in the intranet 42. Upon receiving the notification that the update disabled state cannot be set, the intranet 43 releases the setting of the update disabled state in both the intranet 42 and the intranet 43, and notifies a requesting user of the information update failure. The update process is thus ended by the side of the intranet 43.

In response to the notification of the completion of the setting of the update disabled state from the intranet 42, the intranet 41 continues the information update process to the end thereof.

As shown in FIG. 19, the intranets 41 through 44 contend for information updating. Update requests are originated in the intranets 41 and 44. The intranet 41 requests the intranet 42 to set the update disabled state, and the intranet 44 requests the intranet 43 to set the update disabled state. The update disabled state is already set in the intranet 43 by the intranet 44 when the intranet 41 requests the intranet 43 to set the update disabled state after the intranet 41 sets the update disabled state in the intranet 42. The intranet 43 thus replies a notification that rejects the request of the intranet 41 to set the update disabled state. As a result, the intranet 41 shifts into an update release process, resulting an update failure.

A request of the intranet 44 requesting the intranet 42 to set the update disabled state is also rejected as the request of the intranet 41 to the intranet 43. The information update process originated in intranet 44 is thus aborted.

FIG. 20 illustrates a process sequence in the case of an update contention among the intranets 41 through 44. The process of FIG. 20 is different from the process of FIG. 19 in that the releasing of the setting of the update disabled state from the intranet 41 to the intranet 42 is completed prior to the request of the intranet 44 to set the update disabled state. The update process originated in the intranet 41 is rejected (update failure), but the update process originated in the intranet 44 is continuously performed because of no intranet contention.

As described above, the intranet contention for the information updating is avoided by setting the update disabled state prior to the update process. A user who is notified of the update failure forces an application program to end. The user can thus update information by performing information acquisition again. The setting of the update disabled state performed prior to the update process allows a communication failure occurring in the Internet 6 to be detected prior to the update process. The user can thus check a communication state among the intranets sharing information. When communications with all intranets sharing the information are difficult, information updating is not performed. Discrepancy in the shared information due to a communication failure is thus controlled.

The information processing system, the information processing apparatus, the information processing method, and the information processing program of the present invention provide the following technical features.

When update requests for information shared by the intranets are originated in information processing apparatuses in a plurality of intranets connected to each other via a network in the information processing system, an information processing apparatus in the intranet receiving the request reads information management data corresponding to information shared by the intranets. If the intranet determines the update disabled state is not set, the intranet sets the information management data corresponding to the shared information to the update disabled state. When the update disabled state is set in the information management data in all information processing apparatuses in the intranets sharing the information, the information update process is performed. This arrangement prevents the information processing apparatuses in the intranets from performing the update process of the shared information individually and concurrently.

In the information processing system, an information synchronizer in an intranet receiving the request starts updating the shared information after the update-disabled state is set in the intranets. The information synchronizer then performs the update process to the information shared by the intranets, and notifies the update requesting intranet that the updating of the shared information is complete. When an information synchronizer in the update requesting intranet receives the notification, the completion of the information update is acknowledged. In this way, the normal ending of the updating of the information shared by the intranets is monitored.

In the information processing system, the electronic mail is used as a communication medium to exchange requests to set the update disabled state in the information shared among the intranets, update requests to update the shared information, and updated information. The shared information is exchanged between the intranets that have access limit from the outside and are different in security policy one from another, without loss of time and without being aware of security restrictions.

The intranets sharing information includes the shared information area storing the shared information, and the information management area storing the information management data of the shared information. In the middle of the information updating between the intranets, whether the shared information is currently being updated is easily determined by referencing the information management data in the information management area.

When a request is transmitted to the intranet sharing information, the mail generator generates an electronic mail. Upon receiving an electronic mail from the intranet sharing the information, the mail analyzer analyses the electronic mail. The information synchronizer thus simplifies a transmission process and a reception process. In this arrangement, no delay is involved in the reply to the requests from a plurality of intranets sharing the information.

In the above discussion, the shared information is a document. However, the shared information can include files, and data in addition to the document.

The information display and updating unit is a document editing software program in a personal computer. The information display and updating unit can be any program as long as the program can edit a file in a server in an intranet.

In the previously discussed embodiment, the information synchronizer, the main generator, and the mail analyzer are contained in the information synchronization server. However, these elements can be distributed among a plurality of servers in each intranet.

The information management unit, the shared information area, and the information management area are contained in the file server. Alternatively, these elements can be contained in the information synchronization server. The shared information area and the information management area can be arranged in separate servers in the intranet.

The information display and updating unit may be arranged external to the intranet.

In the above discussion, the information synchronizer transmits and receives requests of the intranets sharing the information in parallel. A transmission route for the shared information can be set beforehand, and other intranets perform the transmission of the shared information, successively in rotation, in accordance with a predetermined transmission order.

The intranets storing shared information can be in charge of information unique thereto. The information management data corresponding to the shared information can contain data representing the corresponding intranet.

The information management units 114 and 214 determine whether the update disabled state is set. Alternatively, such a determination process can be performed by the information synchronizers 108 and 208.

Although the most preferred embodiments of the present invention have been described hereinabove, it is to be appreciated that the present invention is not limited to the above description and that various changes and modifications will naturally occur to those skilled in the art without departing from the spirit and the scope of the invention defined in the appended claims or disclosed herein. Moreover, needless to say, such changes and modifications are encompassed in the scope of the present invention.

The entire disclosure of Japanese Patent Application No. 2004-322426 including specification, claims, drawings and summary are incorporated herein by reference in its entirety.

What is claimed is:

1. An information processing apparatus, present in an intranet, sharing information with an information processing apparatus present in the other intranet connected to the intranet via a network, the information processing apparatus comprising:
   a memory that stores the information; and
   a controller that sets the information stored in the memory to an update disabled state when updating the information stored in the memory, requests the information processing apparatus sharing the information and present in the other intranet to set an update disabled state if the information is in an updated enabled state, and updates the information if the update disabled state is set in all information processing apparatuses, and
   wherein the controller sets the information to the update disabled state in the updating of the information stored in the memory if the information stored in the memory is in the update enabled state, and releases the update disabled state if the information processing apparatus present in the other intranet is in the update disabled state.

2. The information processing apparatus according to claim 1, wherein the memory stores information representing one of the update disabled state and the releasing of the update disabled state set in the information.

3. The information processing apparatus according to claim 1, wherein requests to set the update disabled state and to update the information, issued by the controller, are transmitted in an electronic mail.

4. The information processing apparatus according to claim 1, wherein for a particular intranet to set the information to the update disabled state, the controller inhibits any intranet other than the particular intranet from releasing the update disabled state and updating the information.

5. An information processing apparatus, present in an intranet, sharing information with an information processing apparatus present in the other intranet connected to the intranet via a network, the information processing apparatus comprising:
   a memory storing the information;
   an information updating unit receiving a request to update the information;
   an information management unit determining, in response to the update request, whether the information is in an update enabled state, setting an update disabled state if it is determined that the information is in the update enabled state, and updating the information in synchronization with the information processing apparatus present in the other intranet; and
   an information synchronizing unit determining whether the information in the information processing apparatus present in the other intranet is in an update enabled state, requesting the information processing apparatus in the other intranet to set the update disabled state therewithin if it is determined the information processing apparatus in the other intranet is in the update enabled state, and requesting the information processing apparatus present in the other intranet to update the information on condition that the information processing apparatus in the intranet and the information processing apparatus present in the other intranet are set in the update disabled state.

6. A method of an information processing apparatus, present in an intranet, sharing information with an information processing apparatus present in the other intranet connected to the intranet via a network, the method comprising steps of:
   updating the information stored in a memory;
   setting an update disabled state in the updating of the information if the information is in an update enabled state;
   requesting the information processing apparatus present in the other intranet and sharing the information to set an update disabled state; and
   updating the information on condition that the update disabled state is set in all information processing apparatuses sharing the information and present in the intranets, and
   wherein said setting includes setting the information to the update disabled state in the updating of the information stored in the memory if the information stored in the memory is in the update enabled state, and releasing the update disabled state if the information processing apparatus present in the other intranet is in the update disabled state.

7. A computer program for causing a computer to perform a method of an information processing apparatus, present in an intranet, sharing information with an information processing apparatus present in the other intranet connected to the intranet via a network, the computer program executed on the computer comprising:
   updating the information stored in a memory;
   setting an update disabled state in the updating of the information if the information is in an update enabled state;
   requesting the information processing apparatus present in the other intranet and sharing the information to set an update disabled state; and
   updating the information on condition that the update disabled state is set in all information processing apparatuses sharing the information and present in the intranets, and
   wherein said setting includes setting the information to the update disabled state in the updating of the information stored in the memory if the information stored in the memory is in the update enabled state, and releasing the update disabled state if the information processing apparatus present in the other intranet is in the update disabled state.

8. A recording medium storing a computer program for causing a computer to perform a method of an information processing apparatus, present in an intranet, sharing information with the information processing apparatus present in the other intranet connected to the intranet via a network, the computer program executed on the computer comprising:
   updating the information stored in a memory;
   setting an update disabled state in the updating of the information if the information is in an update enabled state;
   requesting the information processing apparatus present in the other intranet and sharing the information to set an update disabled state; and
   updating the information on condition that the update disabled state is set in all information processing apparatuses sharing the information and present in the intranets, and wherein said setting includes setting the information to the update disabled state in the updating of the information stored in the memory if the information stored in the memory is in the update enabled state, and releasing the update disabled state if the information processing apparatus present in the other intranet is in the update disabled state.

9. An information processing system of an intranet sharing information with the other intranet connected to the intranet via a network, each intranet comprising:

a memory that stores the information; and a controller that sets the information stored in the memory to an update disabled state when updating of the information stored in the memory, requests the other intranet sharing the information to set an update disabled state if the information is in an update enable state, and updates the information if the update disabled state is set in all intranets sharing the information, and wherein the controller sets the information to the update disabled state in the updating of the information stored in the memory if the information stored in the memory is in the update enabled state, and releases the update disabled state if the information processing apparatus present in the other intranet is in the update disabled state.

* * * * *

UNITED STATES PATENT AND TRADEMARK OFFICE
CERTIFICATE OF CORRECTION

PATENT NO. : 7,392,252 B2  
APPLICATION NO. : 11/066463  
DATED : June 24, 2008  
INVENTOR(S) : Hiroshi Tsukada et al.

Page 1 of 1

It is certified that error appears in the above-identified patent and that said Letters Patent is hereby corrected as shown below:

Column 22, Line 3, change "enable" to --enabled--.

Signed and Sealed this

Seventh Day of October, 2008

JON W. DUDAS  
*Director of the United States Patent and Trademark Office*